(12) United States Patent
de Montmorillon et al.

(10) Patent No.: US 10,962,708 B2
(45) Date of Patent: Mar. 30, 2021

(54) BENDING-LOSS INSENSITIVE SINGLE MODE FIBRE, WITH A SHALLOW TRENCH, AND CORRESPONDING OPTICAL SYSTEM

(71) Applicant: Draka Comteq France, Paron (FR)

(72) Inventors: Louis-Anne de Montmorillon, Paron (FR); Pierre Sillard, Paron (FR)

(73) Assignee: Draka Comteq France, Paron (FR)

( * ) Notice: Subject to any disclaimer, the term of this patent is extended or adjusted under 35 U.S.C. 154(b) by 0 days.

(21) Appl. No.: 16/954,758

(22) PCT Filed: Dec. 21, 2017

(86) PCT No.: PCT/IB2017/001722
§ 371 (c)(1),
(2) Date: Jun. 17, 2020

(87) PCT Pub. No.: WO2019/122943
PCT Pub. Date: Jun. 27, 2019

(65) Prior Publication Data
US 2020/0319398 A1   Oct. 8, 2020

(51) Int. Cl.
*G02B 6/028* (2006.01)
*G02B 6/02* (2006.01)
*G02B 6/036* (2006.01)

(52) U.S. Cl.
CPC ....... *G02B 6/0281* (2013.01); *G02B 6/02009* (2013.01); *G02B 6/0365* (2013.01); *G02B 6/03627* (2013.01)

(58) Field of Classification Search
CPC .............. G02B 6/0281; G02B 6/02009; G02B 6/03627; G02B 6/0365
See application file for complete search history.

(56) References Cited

U.S. PATENT DOCUMENTS

| RE30,635 E | 6/1981 | Kuppers et al. |
| 4,314,833 A | 2/1982 | Kuppers |

(Continued)

FOREIGN PATENT DOCUMENTS

| CN | 101688946 A | 3/2010 |
| CN | 102116897 A | 7/2011 |

(Continued)

OTHER PUBLICATIONS

International Search Report in counterpart International Application No. PCT/IB2017/001722 dated Aug. 30, 2018, pp. 1-3.

(Continued)

*Primary Examiner* — Ryan A Lepisto
(74) *Attorney, Agent, or Firm* — Additon, Higgins & Pendleton, P.A.

(57) ABSTRACT

The invention concerns a bending-loss single mode optical fibre having a Mode Field Diameter at 1310 nm greater than or equal to 9 microns and having a core and a cladding, the core refractive index profile having a trapezoid-like shape. According to an aspect of the invention, the cladding comprises a shallow trench with a refractive index difference $\Delta n_t$ between $-2 \times 10^{-3}$; and $-0.9 \times 10^{-3}$, and: the trapezoid ratio $r_0/r_1$ of the core is between 0.1 and 0.6, preferably, between 0.2 and 0.5, more preferably between 0.25 and 0.45; the core surface integral Formula (I) is between 20.10 3 µm and $24.10^{-3}$ µm and the cladding surface integral Formula (II) is between $-25 \times 10^{-3}$ µm and $-9 \times 10^{-3}$ µm, where $\Delta n(r)$ is the refractive-index difference with respect to said outer cladding as a function of the radius r, and said single mode optical fibre fulfils the following criterion: $25.7 \times 10^{-3} \leq V_{O1} - 0.2326 V_{O2} \leq 26.8 \times 10^{-3}$.

20 Claims, 6 Drawing Sheets

(56) References Cited

U.S. PATENT DOCUMENTS

Figure 1:
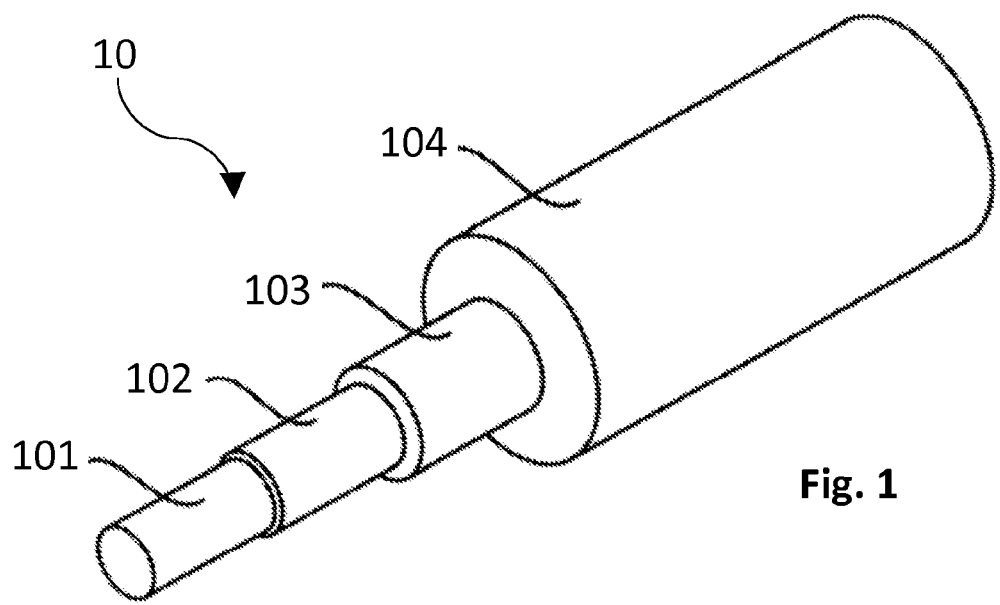

| | | | |
|---|---|---|---|
| 4,516,826 A | 5/1985 | Paek | |
| 4,755,022 A | 7/1988 | Ohashi et al. | |
| 4,852,968 A | 8/1989 | Reed | |
| 5,913,005 A * | 6/1999 | Terasawa | G02B 6/02009 385/124 |
| 5,946,439 A * | 8/1999 | Terasawa | G02B 6/02009 385/123 |
| 6,396,987 B1 | 5/2002 | de Montmorillon et al. | |
| 6,529,666 B1 | 3/2003 | Dultz et al. | |
| 6,625,360 B2 | 9/2003 | Kyogoku et al. | |
| 6,771,865 B2 | 8/2004 | Blaszyk et al. | |
| 6,879,764 B2 | 4/2005 | Changdar et al. | |
| 7,171,090 B2 | 1/2007 | Mattingly, III et al. | |
| 7,187,833 B2 | 3/2007 | Mishra | |
| 7,221,838 B2 | 5/2007 | Jakobsen et al. | |
| 7,356,234 B2 | 4/2008 | de Montmorillon et al. | |
| 7,366,387 B2 | 4/2008 | Matsuo et al. | |
| 7,450,807 B2 | 11/2008 | Bickham et al. | |
| 7,483,613 B2 | 1/2009 | Bigot-Astruc et al. | |
| 7,555,186 B2 * | 6/2009 | Flammer | G02B 6/0365 385/127 |
| 7,555,187 B2 | 6/2009 | Bickham et al. | |
| 7,623,747 B2 * | 11/2009 | De Montmorillon | G02B 6/0365 385/124 |
| 7,702,204 B2 | 4/2010 | Gonnet et al. | |
| 7,876,990 B1 | 1/2011 | Mishra | |
| 7,889,960 B2 * | 2/2011 | de Montmorillon | G02B 6/0365 385/127 |
| 7,894,698 B2 | 2/2011 | Flammer et al. | |
| 8,009,950 B2 | 8/2011 | Molin et al. | |
| 8,041,172 B2 | 10/2011 | Sillard et al. | |
| 8,055,111 B2 | 11/2011 | Sillard et al. | |
| 8,131,125 B2 | 3/2012 | de Montmorillon et al. | |
| 8,145,025 B2 | 3/2012 | de Montmorillon et al. | |
| 8,145,027 B2 * | 3/2012 | Overton | C03C 25/105 385/128 |
| 8,259,389 B2 | 9/2012 | Pastouret et al. | |
| 8,265,439 B2 | 9/2012 | Gonnet et al. | |
| 8,265,440 B2 | 9/2012 | Gonnet et al. | |
| 8,280,213 B2 | 10/2012 | Molin et al. | |
| 8,290,324 B2 | 10/2012 | Sillard et al. | |
| 8,301,000 B2 | 10/2012 | Sillard et al. | |
| 8,340,488 B2 | 12/2012 | Molin et al. | |
| 8,385,704 B2 | 2/2013 | Molin et al. | |
| 8,385,705 B2 | 2/2013 | Overton et al. | |
| 8,391,661 B2 | 3/2013 | Molin et al. | |
| 8,406,593 B2 | 3/2013 | Molin et al. | |
| 8,428,410 B2 | 4/2013 | Molin et al. | |
| 8,428,411 B2 * | 4/2013 | de Montmorillon | G02B 6/0365 385/124 |
| 8,428,414 B2 | 4/2013 | de Montmorillon et al. | |
| 8,483,535 B2 | 7/2013 | Molin et al. | |
| 8,520,993 B2 | 8/2013 | Molin et al. | |
| 8,542,969 B2 | 9/2013 | Bookbinder et al. | |
| 8,565,568 B2 | 10/2013 | Bigot-Astruc et al. | |
| 8,588,569 B2 * | 11/2013 | Bookbinder | G02B 6/03638 385/124 |
| 8,639,079 B2 * | 1/2014 | Molin | G02B 6/0288 385/124 |
| 8,644,664 B2 | 2/2014 | Molin et al. | |
| 8,666,214 B2 * | 3/2014 | Bookbinder | G02B 6/028 385/124 |
| 8,676,015 B2 * | 3/2014 | Sillard | G02B 6/02271 385/127 |
| 8,724,950 B2 | 5/2014 | Molin et al. | |
| 8,798,423 B2 | 8/2014 | Sillard et al. | |
| 8,798,424 B2 | 8/2014 | Bigot-Astruc et al. | |
| 8,849,082 B2 | 9/2014 | Bookbinder et al. | |
| 8,867,879 B2 * | 10/2014 | Bigot-Astruc | G02B 6/02019 385/123 |
| 8,867,880 B2 | 10/2014 | Molin et al. | |
| 8,879,878 B2 * | 11/2014 | Bigot-Astruc | G02B 6/03683 385/126 |
| 8,891,074 B2 | 11/2014 | Molin et al. | |
| 8,983,260 B2 * | 3/2015 | Sillard | G02B 6/0228 385/127 |
| 9,014,525 B2 * | 4/2015 | Molin | G02B 6/0365 385/127 |
| 9,067,816 B2 | 6/2015 | Milicevic et al. | |
| 9,162,917 B2 | 10/2015 | Burov et al. | |
| 9,201,192 B2 * | 12/2015 | Zhang | G02B 6/0283 |
| 9,341,771 B2 | 5/2016 | Molin et al. | |
| 9,405,062 B2 | 8/2016 | Krabshuis et al. | |
| 9,507,084 B2 * | 11/2016 | Fini | G02B 6/02019 |
| 10,295,733 B2 * | 5/2019 | de Montmorillon | G02B 6/0365 |
| 2003/0063878 A1 | 4/2003 | Matsuo et al. | |
| 2003/0223717 A1 | 12/2003 | Blaszyk et al. | |
| 2004/0197063 A1 | 10/2004 | Changdar et al. | |
| 2007/0258686 A1 | 11/2007 | de Montmorillon et al. | |
| 2008/0031582 A1 | 2/2008 | Gonnet et al. | |
| 2008/0107426 A1 | 5/2008 | Bigot-Astruc et al. | |
| 2008/0152288 A1 | 6/2008 | Flammer et al. | |
| 2009/0252469 A1 | 10/2009 | Sillard et al. | |
| 2009/0263092 A1 | 10/2009 | Flammer et al. | |
| 2009/0279835 A1 | 11/2009 | de Montmorillon et al. | |
| 2009/0279836 A1 | 11/2009 | de Montmorillon et al. | |
| 2010/0118388 A1 | 5/2010 | Pastouret et al. | |
| 2010/0189399 A1 | 7/2010 | Sillard et al. | |
| 2010/0189400 A1 | 7/2010 | Sillard et al. | |
| 2010/0254653 A1 | 10/2010 | Molin et al. | |
| 2010/0290781 A1 | 11/2010 | Overton et al. | |
| 2010/0310218 A1 | 12/2010 | Molin et al. | |
| 2011/0044595 A1 | 2/2011 | Sillard et al. | |
| 2011/0058780 A1 * | 3/2011 | Han | C23C 16/56 385/124 |
| 2011/0058781 A1 | 3/2011 | Molin et al. | |
| 2011/0064367 A1 | 3/2011 | Molin et al. | |
| 2011/0123161 A1 | 5/2011 | Molin et al. | |
| 2011/0123162 A1 | 5/2011 | Molin et al. | |
| 2011/0135262 A1 | 6/2011 | Molin et al. | |
| 2011/0135263 A1 | 6/2011 | Molin et al. | |
| 2011/0188823 A1 | 8/2011 | Sillard et al. | |
| 2011/0188826 A1 | 8/2011 | Sillard et al. | |
| 2011/0217012 A1 | 9/2011 | Bigot-Astruc et al. | |
| 2011/0229101 A1 | 9/2011 | de Montmorillon et al. | |
| 2011/0305423 A1 | 12/2011 | Molin et al. | |
| 2012/0040184 A1 * | 2/2012 | de Montmorillon | C03B 37/01807 428/376 |
| 2012/0051703 A1 | 3/2012 | Bigot-Astruc et al. | |
| 2012/0092651 A1 | 4/2012 | Molin et al. | |
| 2012/0189258 A1 | 7/2012 | Overton et al. | |
| 2012/0195549 A1 | 8/2012 | Molin et al. | |
| 2012/0195561 A1 | 8/2012 | Molin et al. | |
| 2012/0224254 A1 | 9/2012 | Burov et al. | |
| 2012/0243843 A1 | 9/2012 | Molin et al. | |
| 2012/0251062 A1 | 10/2012 | Molin et al. | |
| 2012/0275751 A1 | 11/2012 | Krabshuis et al. | |
| 2012/0301093 A1 | 11/2012 | Sillard et al. | |
| 2013/0004135 A1 | 1/2013 | Bigot-Astruc et al. | |
| 2013/0028564 A1 | 1/2013 | Molin et al. | |
| 2013/0114935 A1 | 5/2013 | Bookbinder et al. | |
| 2013/0279868 A1 | 10/2013 | Zhang et al. | |
| 2013/0315006 A1 | 11/2013 | Lim | |

FOREIGN PATENT DOCUMENTS

| | | |
|---|---|---|
| CN | 102819063 A | 12/2012 |
| CN | 102854563 A | 1/2013 |
| CN | 104169761 A | 11/2014 |
| CN | 102798927 A | 4/2016 |
| EP | 1288682 A1 | 3/2003 |
| EP | 2369379 A1 | 9/2011 |
| JP | 09-048629 A | 2/1997 |
| JP | 09-218319 A | 8/1997 |
| JP | 2003-104751 A | 4/2003 |
| WO | 02/27367 A1 | 4/2002 |
| WO | 2008/027336 A1 | 3/2008 |

(56) References Cited

FOREIGN PATENT DOCUMENTS

| WO | 2013/066964 A1 | 5/2013 |
| WO | 2015/092464 A1 | 6/2015 |
| WO | 2019/122943 A1 | 6/2019 |

OTHER PUBLICATIONS

Tsujikawa et al., "Rayleigh Scattering Reduction Method for Silica-Based Optical Fiber", Journal of Lightwave Technology, vol. 18, No. 11, Nov. 2000, pp. 1-5.
Hermann et al., "Refractive Index of Doped and Undoped PCVD Bulk Silica", Mat. Res. Bull., vol. 24, pp. 1083-1097, 1989.

* cited by examiner

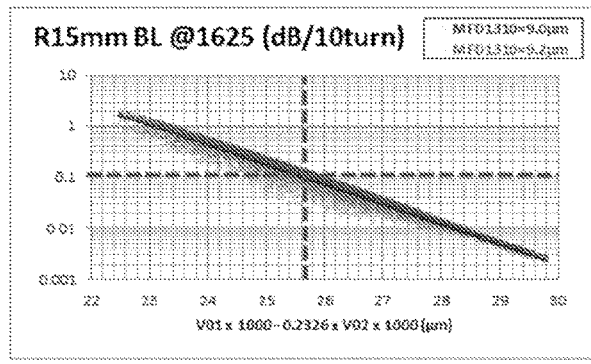
Fig. 6D
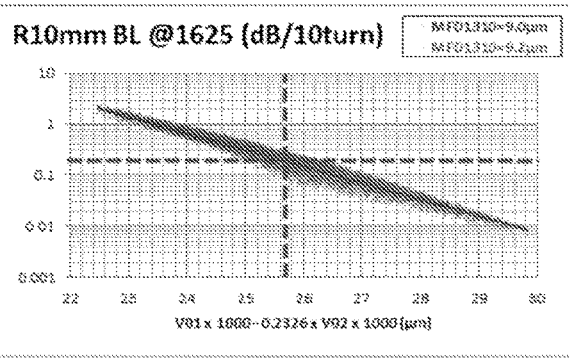
Fig. 6E
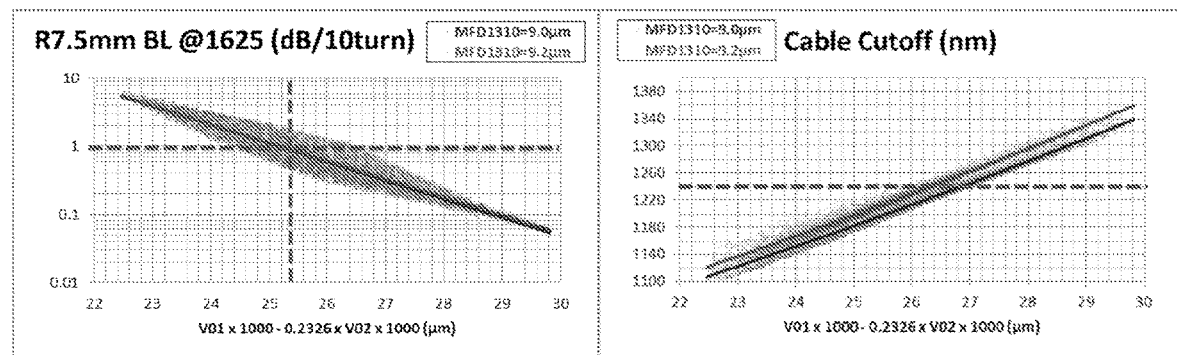
Fig. 6F
Fig. 6G

BENDING-LOSS INSENSITIVE SINGLE MODE FIBRE, WITH A SHALLOW TRENCH, AND CORRESPONDING OPTICAL SYSTEM

1. FIELD OF THE INVENTION

The invention relates to single-mode optical fibres used in optical transmission systems, optical transmission systems comprising such single mode fibres, and fabrication methods thereof. More specifically, the present invention relates to single-mode optical fibres, which are bending-loss insensitive, and compliant with the ITU-T G.657.A2 standard.

2. BACKGROUND

Telecommunication systems require optical fibre, which is capable of transmitting signals for a long distance without degradation. Such optical-fibre transmission systems often use single-mode optical fibres (SMFs), such as, for example, so-called "standard" single-mode fibres (SSMFs), which are used in terrestrial transmission systems.

To facilitate compatibility between optical systems from different manufacturers, the International Telecommunication Union (ITU) has defined several standards with which a standard optical transmission fibre should comply. Among these standards, the ITU-T G. 652 recommendation (Last revision of November 2016) describes the characteristics of single-mode fibre and cable-based networks, which can answer the growing demand for broadband services. The ITU-T G. 652 recommendation has several attributes (i.e. A, B, C and D) defining the fibre attributes of a single mode optical fibre.

As the specific use in an optical access network puts different demands on the fibre and cable, which impacts its optimal performance characteristics, the ITU-T G. 657 recommendation focuses more precisely on bending-loss insensitive single mode optical fibres, which show strongly improved bending performance compared with the existing ITU-T G.652 single-mode fibre and cables. Actually, such improved bending performance is necessary, due to the high density network of distribution and drop cables in the access network, as well as to the limited space and the many manipulations needed, which ask for operator-friendly fibre performance and low bending sensitivity.

Both ITU-T G. 652 and ITU-T G. 657 standards are herein incorporated by reference in their entirety.

The ITU-T G. 657 recommendation describes two categories (A and B) of single-mode optical fibre cable which are suitable for use in access networks, including inside buildings at the end of these networks. Both categories A and B contain two subcategories which differ in macrobending loss.

Category A fibres are optimized for reduced macrobending loss and tighter dimensional specifications compared to ITU-T G.652.D fibres and can be deployed throughout the access network. These fibres are suitable to be used in the O, E, S, C and L-band (i.e., throughout the 1260 to 1625 nm range). Fibres and requirements in this category are a subset of ITU-T G.652.D and therefore compliant with ITU-T G.652.D fibres and have the same transmission and interconnection properties.

Subcategory ITU-T G.657.A1 fibres are appropriate for a minimum design radius of 10 mm. Subcategory ITU-T G.657.A2 fibres are appropriate for a minimum design radius of 7.5 mm.

Table 1 in the ITU-T G.657 Recommendation (ITU-T G.657 category A attributes; November 2016 Issue) provides the ranges or limits on values of the single-mode fibre characteristics in order for them to comply with the ITU-T G.657.A recommendation.

Macrobending loss observed in uncabled fibres varies with wavelength, bend radius and the number of turns about a mandrel with a specified radius. In order for a SMF to comply with the ITU-T G.657.A recommendation, macrobending loss shall not exceed the maximum value given in the below table for the specified wavelength(s), bend radii and number of turns.

Although the ITU-T G.657.A recommendation does not provide any specific requirement as regards the refractive index profile of the optical fibre, which does not need to be known according to the standard, it must be noted that single mode optical fibres with trench assisted refractive index profiles have been introduced in the market. Thanks to this design, improved macro-bending losses can be reached, compared to legacy step index designs. Nowadays, it is this profile design type which is used to manufacture fibres compliant with the ITU-T G. 657. A2 recommendation.

TABLE 1

| ITU-T G.657.A attributes | | | |
|---|---|---|---|
| Fibre attributes | | | |
| Attribute | Detail | Value | Unit |
| Mode field diameter | Wavelength | 1 310 | nm |
|  | Range of nominal values | 8.6-9.2 | µm |
|  | Tolerance | ±0.4 | µm |
| Cladding diameter | Nominal | 125.0 | µm |
|  | Tolerance | ±0.7 | µm |
| Core concentricity error | Maximum | 0.5 | µm |
| Cladding non-circularity | Maximum | 1.0 | % |
| Cable cut-off wavelength | Maximum | 1 260 | nm |

TABLE 1-continued

| | | ITU-T G.657.A attributes | | | | | |
|---|---|---|---|---|---|---|---|
| | | ITU-T G.657.A1 | | ITU-T G.657.A2 | | | |
| Uncabled fibre macrobending loss (Notes 1, 2) | Radius | 15 | 10 | 15 | 10 | 7.5 | mm |
| | Number of turns | 10 | 1 | 10 | 1 | 1 | |
| | Max. at 1 550 nm | 0.25 | 0.75 | 0.03 | 0.1 | 0.5 | dB |
| | Max. at 1 625 nm | 1.0 | 1.5 | 0.1 | 0.2 | 1.0 | dB |
| | | ITU-T G.657 category A | | | | | |
| Proof stress | Minimum | 0.69 | | | | | GPa |
| Chromatic parameter | $\lambda_{0min}$ | 1 300 | | | | | nm |
| | $\lambda_{0max}$ | 1 324 | | | | | nm |
| 3-term Sellmeier fitting (1 260 nm to 1 460 nm) | $S_{0min}$ | 0.073 | | | | | ps/(nm$^2$ × km) |
| | $S_{0max}$ | 0.092 | | | | | ps/(nm$^2$ × km) |
| Linear fitting (1 460 nm to 1 625 nm) | Min. at 1550 nm | 13.3 | | | | | ps/(nm × km) |
| | Max. at 1550 nm | 18.6 | | | | | ps/(nm × km) |
| | Min. at 1625 nm | 17.2 | | | | | ps/(nm × km) |
| | Max. at 1625 nm | 23.7 | | | | | ps/(nm × km) |
| | | Cable attributes | | | | | |
| Attenuation coefficient (Note 3) | Maximum from 1 310 nm to 1 625 nm (Note 4) | 0.40 | | | | | dB/km |
| | Maximum at 1 383 nm ±3 nm after hydrogen ageing (Note 5) | 0.40 | | | | | dB/km |
| | Maximum at 1 530-1 565 nm | 0.30 | | | | | dB/km |
| PMD coefficient | M | 20 | | | | | cables |
| | Q | 0.01 | | | | | % |
| | Maximum PMD$_Q$ | 0.20 | | | | | ps/km$^{1/2}$ |

More precisely, up to day, in order to comply with the tightest ITU-T G. 657. A2 specification, bend insensitive single mode fibres require a deep trench in the cladding. Actually, for the time being, single mode fibres without such a deep trench in the cladding can comply with the worst G.657.A category, i.e. G.657.A1, but not with the G.657.A2 category, because of their high macro-bending losses level for 7.5 mm and 10 mm bend radii.

Moreover, as appears in the above table, the ITU-T G. 657. A2 specification accepts nominal Mode Field Diameter (MFD) at a wavelength of 1310 nm comprised between 8.6 μm and 9.2 μm. The ITU-T G. 652.D standard also accepts nominal Mode Field Diameter (MFD) at a wavelength of 1310 nm comprised between 8.6 μm and 9.2 μm. However, while commercialized G. 652.D fibres are generally targeting a nominal MFD at 1310 nm at the high end of the specification, that is, between 9.0 μm and 9.2 μm, the currently commercialized G. 657.A fibres are generally designed to have a Mode Field Diameter at the low end of the specification, i.e. between 8.6 μm and 8.8 μm. Actually, most G. 657.A fibres manufacturers had to play on the Mode Field Diameter, and lower it, in order to achieve the demanding requirements of the G. 657.A standard as regards macrobending losses.

To improve backward compatibility (in particular regarding splices and reduce misinterpretation with OTDR ("Optical Time Domain Reflectometer")) with standard step-index G.652.D fibres, it is preferable to have a G.657.A2 fibre without trench and that is targeting a nominal MFD at 1310 nm between 9.0 and 9.2 μm.

Patent document WO2015/092464, in the name of the Applicant, describes a single mode optical fibre having a core and a cladding, the core refractive index profile having a trapezoid-like shape. The transition part of the trapezoid-like core refractive index profile is obtained by gradually changing a concentration of at least two dopants from a concentration in the centre part of the core to a concentration in a cladding part adjacent to the core.

Actually, trapezoid core shape is a well-known solution to control extra losses or to design non-zero dispersion shifted fibres, and is also easier to manufacture than well-known alpha core shapes, used for multimode fibres. However, the profile designs disclosed in this patent document are not compliant with the ITU-T G.657.A2 recommendation, and have Mode Field Diameters at 1310 nm below 9.0 μm.

Patent document U.S. Pat. No. 7,187,833 discloses an optical waveguide fibre having a multi-segmented core surrounded by a cladding, the core having a central segment and an annular segment surrounding the central segment. The central segment has a positive relative refractive index profile, and the annular segment has a negative relative refractive index profile. The optical fibre exhibits an effective area of greater than about 75 μm$^2$ at a wavelength of about 1550 nm, a dispersion slope of less than 0.07 ps/nm$^2$/km at a wavelength of about 1550 nm, a zero-dispersion wavelength of between about 1290 and 1330 nm, and an attenuation of less than 0.20 dB/km, and preferably less than 0.19 dB/km, at a wavelength of about 1550 nm.

Contrarily to patent document WO2015/092464, this document does not disclose a trapezoid core. Moreover, the respective core and trench volumes disclosed in this document do not allow achieving a single mode fibre profile fulfilling the above-listed requirements.

Patent document U.S. Pat. No. 8,849,082 discloses an optical fibre comprising: (I) a germania doped central core region having outer radius $r_1$ and (II) a maximum relative refractive index $\Delta_{1max}$ and a cladding region including (i) a first inner cladding region having an outer radius $r_2>5$ microns and refractive index $\Delta_2$; (ii) a second inner cladding region having an outer radius $r_3>9$ microns and comprising refractive index $\Delta_3$; and (iii) an outer cladding region surrounding the inner cladding region and comprising refractive index $\Delta_4$, wherein $\Delta_{1max} > \Delta_4$, $\Delta_2 > \Delta_3$, and wherein $0.01\% \leq \Delta_4 - \Delta 3 \leq 0.09\%$, said fibre exhibits a 22 m cable cutoff less than or equal to 1260 nm, and $0.25 \leq r_1/r_2 \leq 0.85$.

Contrarily to patent document WO2015/092464, this document does not disclose a trapezoid core. Moreover, although the single mode fibres disclosed in this document are compliant with the ITU-T G.652 standard, it is not clear whether they also comply with the requirements of the ITU-T G.657.A2 standard as regards macrobending losses.

In summary, none of these prior art designs corresponds to a single mode fibre which would be compliant with the ITU-T G.657.A2 recommendation, which cladding would not comprise a deep trench, and which would target a nominal MFD at 1310 nm ranging from 9.0 μm to 9.2 μm.

There is therefore a need for an improved Single Mode Fibre profile, which would be compliant with the ITU-T G.657.A2 recommendation, while being easily spliced with a standard Single Mode Fibre without trench, compliant with the ITU-T G. 652.D standard.

3. SUMMARY

In an embodiment of the present disclosure, a bending-loss insensitive single mode optical fibre having a Mode Field Diameter greater than or equal to 9.0 μm at a 1310 nm wavelength is disclosed. Such an optical fibre has a core surrounded by a cladding, the core refractive index profile having a trapezoid-like shape.

A centre part of the core has a radius $r_0$ and a refractive index $n_0$ and a transition part of the trapezoid-like core refractive index profile ranges from radius $r_0$ to a radius $r_1 > r_0$ with a trapezoid ratio $r_0/r_1$ of the centre part of the core's radius $r_0$ to the transition part's radius $r_1$ between 0.1 and 0.6, preferably between 0.2 and 0.5, and more preferably between 0.25 and 0.45.

The cladding comprises at least one region of depressed refractive index, called a trench, ranging from radius $r_2 \geq r_1$ to radius $r_3 > r_2$ and having a refractive index $n_t$, and an outer cladding ranging from radius $r_3$ to the end of a glass part of the single mode fibre and having a refractive index $n_4$. The refractive-index difference of the trench with respect to the outer cladding $\Delta n_t = n_t - n_4$ is between $-2 \times 10^{-3}$ and $-0.9 \times 10^{-3}$. The core has a surface integral $V_{01}$ between $20.10^{-3}$ μm and $24.10^{-3}$ μm, the surface integral being defined according to the following equation: $V_{01} = \int_0^{r_1} \Delta n(r) \cdot dr$, where $\Delta n(r)$ is the refractive-index difference of the core with respect to the outer cladding as a function of the radius r.

The cladding has a surface integral $V_{02}$ between $-25 \times 10^{-3}$ μm and $-9 \times 10^{-3}$ μm, the surface integral being defined according to the following equation: $V_{02} = \int_{r_1}^{\infty} \Delta n(r) \cdot dr$, where $\Delta n(r)$ is the refractive-index difference of the cladding with respect to the outer cladding as a function of the radius r.

Moreover, the single mode optical fibre fulfils the following criterion:

$$25.7 \times 10^{-3} \leq V_{01} - 0.23261 V_{02} \leq 26.8 \times 10^{-3}.$$

The present disclosure thus relies on a novel and inventive approach to the design of bending-loss insensitive single mode fibres. Actually, a single mode optical fibre according to an embodiment of the present disclosure has a core with a refractive index profile showing a trapezoid shape, instead of the more usual step shape. It is well known that such a trapezoid shape allows reducing the extra scattering losses in the single mode optical fibre, without degrading Rayleigh scattering, or to design non-zero dispersion shifted fibres. However, such a trapezoid shape is here used to enable the single mode optical fibre to be compliant with the ITU-T G.657.A2 standard, while avoiding adding a deep trench in the cladding. Such a trapezoid shape of the core is instead combined with a large, but shallow, trench in the cladding (as defined by the range of allowed values for $V_{02}$), which advantageously replaces the deep trench needed so far for achieving compliance with the ITU-T G.657.A2 standard.

Replacing the deep trench with a shallow and large trench eases splicing with a ITU-T G. 652.D compliant standard SMF, which has no trench.

Moreover, such a trapezoid shape is easier to manufacture, as compared to the alpha-shaped refractive index profile from the prior art, which is not adequate for the small core diameter of single mode optical fibres.

Such a trapezoid shape may be achieved through a gradual change in the concentration of two or more dopants in the transition part from the centre part of the core to the cladding, as disclosed for example in patent document WO2015/092464 in the name of the Applicant which is herein integrated by reference in its entirety.

Moreover, such a bending-loss insensitive single mode optical fibre according to embodiments of the present disclosure has a nominal Mode Field Diameter at the 1310 nm wavelength, which is between 9.0 and 9.2 μm, i.e. at the high end of the ITU-T G.657.A2 standardized range: these nominal MFD values are hence compatible with those of the commercialized ITU-T G.652.D compliant single mode fibres. Their splicing is easier for the user, as it does not induce artefacts in the OTDR.

In addition, for a nominal MFD at 1310 nm between 9.0 and 9.2 μm, the inventors have observed that it was necessary to have $25.7 \times 10^{-3} \leq V_{01} - 0.2326 V_{02}$, in order to achieve macrobending losses at bending radii of 15 mm and 10 mm compliant with the requirements of the ITU-T G. 657.A2 Recommendation.

They have also observed that it was necessary to have $V_{01} - 0.2326 V_{02} \leq 26.8 \times 10^{-3}$ in order to ensure a targeted cable cut-off wavelength below 1240 nm, when the Mode Field Diameter at 1310 nm is at 9.0 μm.

Actually, it is known that macrobending losses decrease when the core surface integral $V_{01}$ increases and when the cladding surface integral $V_{02}$ decreases. The inventors have hence worked out that there must be a positive number k, which allows describing macrobending losses by a mathematical function of the type:

$$f = V_{01} - k \times V_{02}.$$

The same reasoning applies with the cable cutoff wavelength, which tends to increase when the core surface integral $V_{01}$ increases and when the cladding surface integral $V_{02}$ decreases. Hence, there must also be a positive number g, which allows describing the behaviour of the cable cut off wavelength by a mathematical function of the type:

$$f = V_{01} - g \times V_{02}.$$

By trial and error, the inventors have found out that for k=g=0.2326, there is a strong correlation between the f function and the macrobending losses at bending radii of 15 mm and 10 mm on the one hand, and the cable cut-off wavelength on the other hand.

They have hence derived that the optical fibre of the present disclosure should fulfil the criterion: $25.7 \times 10^{-3} \leq V_{01} - 0.2326 V_{02} \leq 26.8 \times 10^{-3}$, in order for it to comply with the requirements of the ITU-T G.657.A2 Recommendation at a MFD at 1310 nm between 9.0 and 9.2 microns.

Moreover, a range for the ratio $r_0/r_1$ between 0.1 and 0.6 is required to have a Zero chromatic Dispersion Wavelength (ZDW) between 1300 nm and 1324 nm (which is required for compliance with the ITU G657.A2 standard). A preferred range for $r_0/r_1$ is between 0.2 and 0.5, while an even narrower range between 0.25 and 0.45 provides a robust working range.

According to a first embodiment of the present disclosure, $r_2=r_1$ and a trench ranging from $r_2$ to $r_3$ surrounds the core. The core surface integral may hence be approximated as $$V_{01} \approx \frac{\Delta n_0(r_1+r_0)+\Delta n_t(r_1-r_0)}{2},$$

where $\Delta n_0 = n_0 - n_4$ is the refractive-index difference of the centre part of the core with respect to the outer cladding, and the cladding surface integral may be approximated as $V_{02} \approx (r_3-r_2) \times \Delta n_t$.

According to a second embodiment of the present disclosure, the cladding comprises an intermediate cladding ranging from radius $r_1$ to radius $r_2 > r_1$ and having a refractive index $n_2$, and the trench surrounds the intermediate cladding.

Such an intermediate cladding eases the optical fibre manufacturing process when it relies on the OVD ("Outside Vapor Deposition") technique.

According to this second embodiment, the core surface integral may hence be approximated as $$V_{01} \approx \frac{\Delta n_0(r_1+r_0)+\Delta n_2(r_1-r_0)}{2},$$

where $\Delta n_0 = n_0 - n_4$ is the refractive-index difference of said centre part of said core with respect to said outer cladding and where $\Delta n_2 = n_2 - n_4$ is the refractive-index difference of said intermediate cladding with respect to said outer cladding, and the cladding surface integral may be approximated as $V_{02} \approx (r_2-r_1) \times \Delta n_2 + (r_3-r_2) \times \Delta n_t$.

According to a preferred aspect of this second embodiment, the refractive index difference of the intermediate cladding with respect to the outer cladding $\Delta n_2 = 0$. The intermediate cladding hence presents a refractive index which is equivalent to that of the external cladding. Such an intermediate cladding is void of any dopant and constitutes a buffer zone between the up-doped core and the down-doped trench.

According to an embodiment of the present disclosure, the core outer radius $r_1$ is between 5.4 µm and 8.0 µm.

According to an embodiment of the present disclosure, the trench outer radius $r_3$ is between 16 µm and 22 µm.

According to an embodiment of the present disclosure, the refractive-index difference of the centre part of the core with respect to the outer cladding $\Delta n_0 = n_0 - n_4$ is between $5 \times 10^{-3}$ and $6 \times 10^{-3}$.

According to an embodiment of the present disclosure, such an optical fibre has a Mode Field Diameter at 1310 nm between 9.0 µm and 9.2 µm.

According to an embodiment of the present disclosure, said optical fibre has a maximum Cable cut-off wavelength of 1240 nm.

Actually, the ITU-T G.657.A2 Recommendation specifies a maximum value of the Cable Cut-off Wavelength of 1260 nm. However, it appears reasonable to target a lower maximum Cable Cut-off Wavelength, around 1240 nm, to ensure that all manufactured optical fibres will pass the cable cut-off recommendation. Targeting a cable cut-off wavelength at 1260 nm is not robust as it would induce 50% of the produced optical fibres out of the G. 657.A2 Recommendation, because of manufacturing defects. Targeting cable cut-off wavelength below 1240 nm is needed to ensure a robust production.

Throughout this document, the Cable Cut-Off wavelength (CCO) corresponds to the cut-off wavelength in cable $\lambda_{cc}$ such as defined by Subcommittee 86A of the International Electrotechnical Commission in the IEC 60793-1-44 standard.

According to an embodiment of the present disclosure, said optical fibre complies with the requirements of the ITU-T G.657.A2 standard.

The present invention also relates to an optical fibre transmission system comprising at least one single mode fibre according to the invention.

4. BRIEF DESCRIPTION OF THE DRAWINGS

Figure 2:
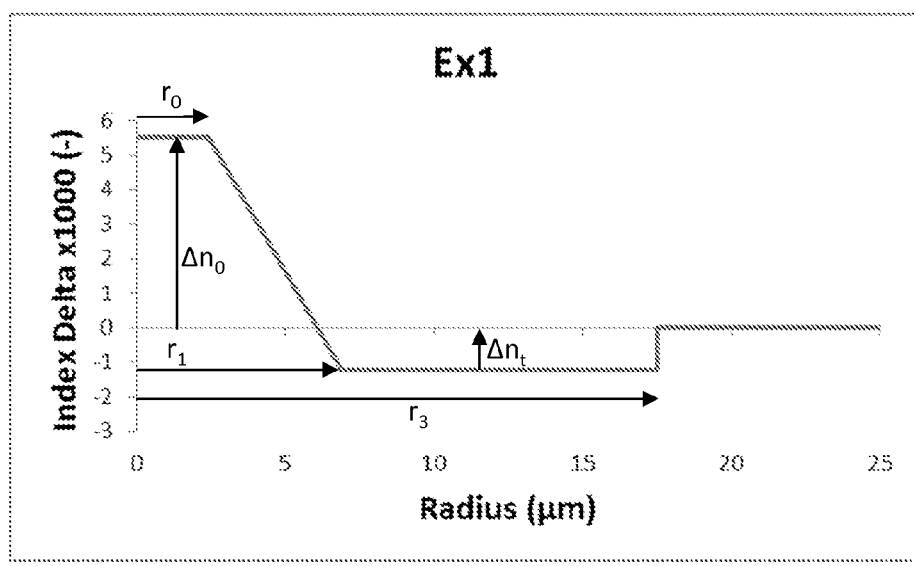
Figure 3:
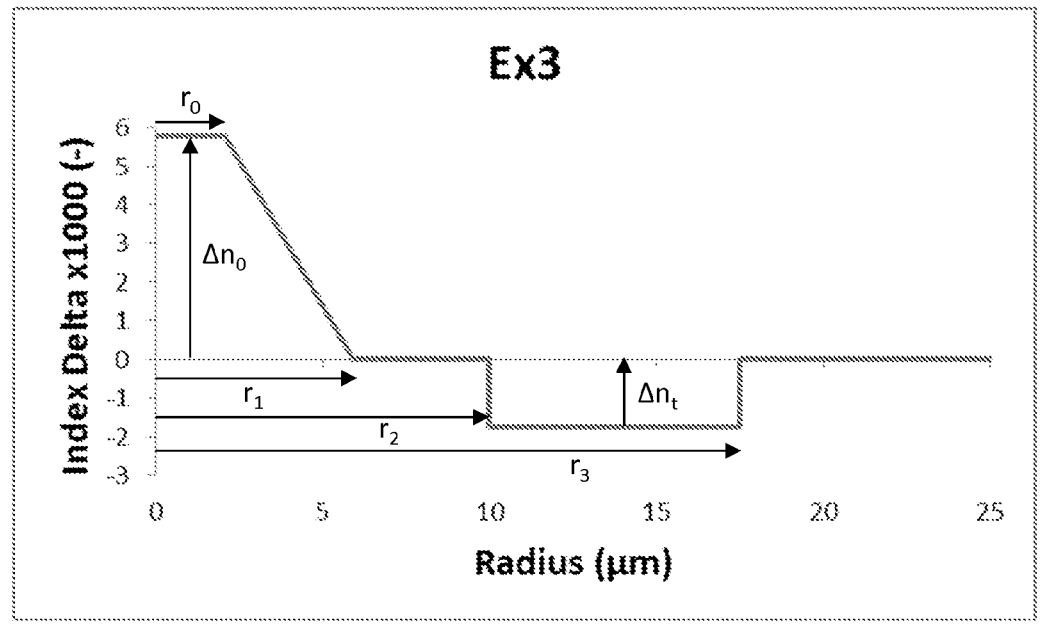
Figure 7:
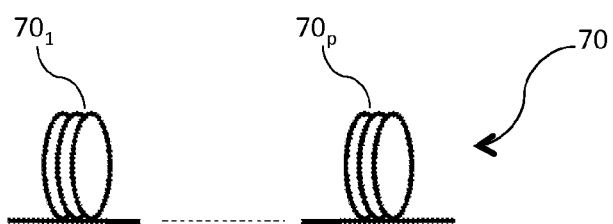
Figure 4A:
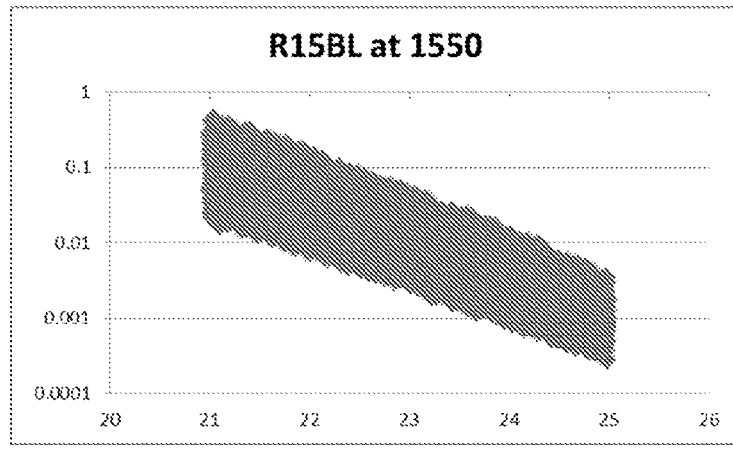
Figure 4B:
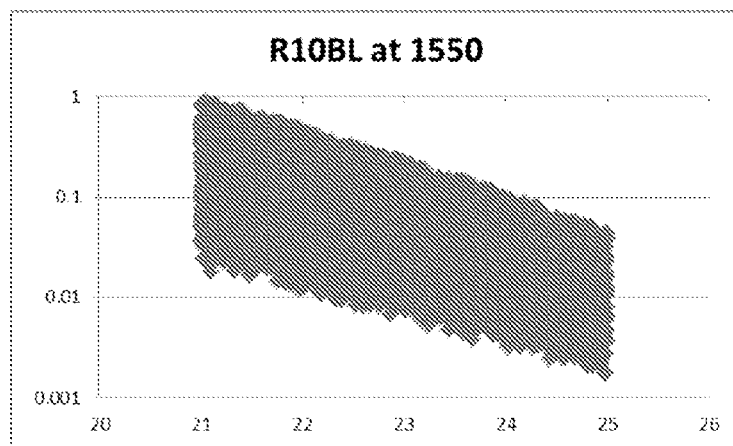
Figure 4C:
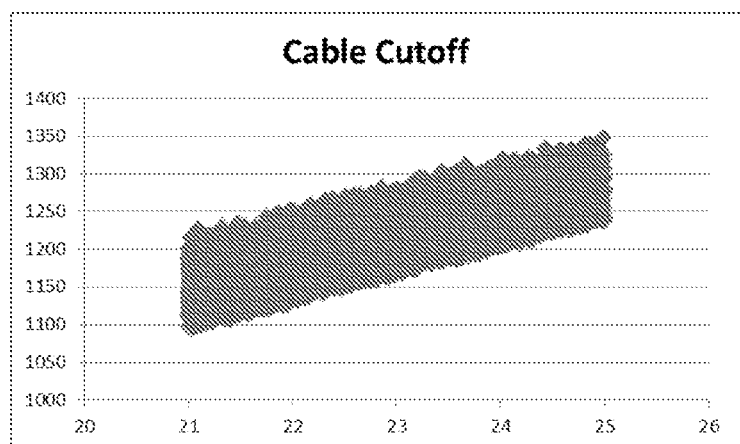
Figure 5A:
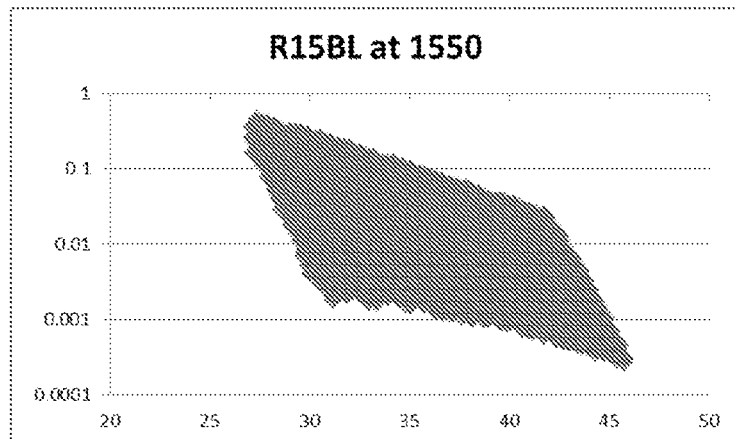
Figure 5B:
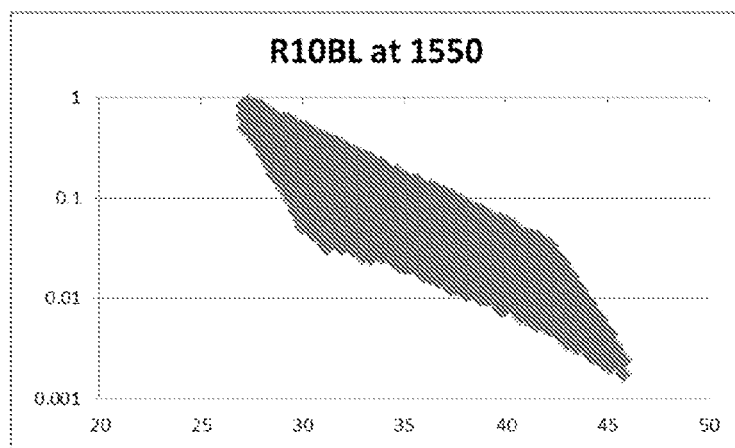
Figure 5C:
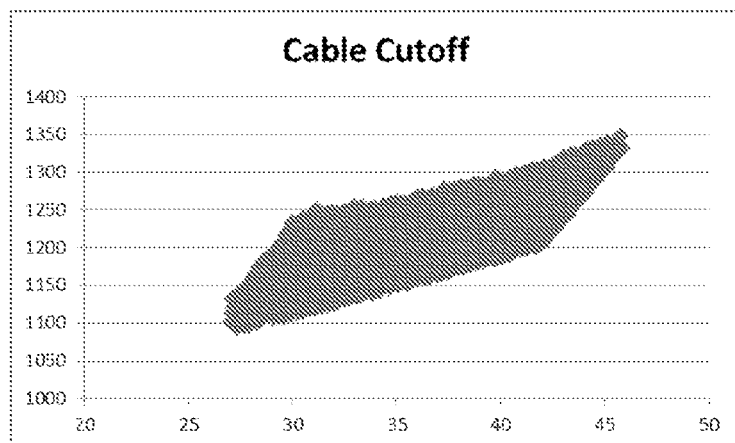

Other features and advantages of embodiments of the invention shall appear from the following description, given by way of an indicative and non-exhaustive example and from the appended drawings, of which:

FIG. 1 schematically depicts an isometric view of an exemplary single mode optical fiber according to one or more embodiments described herein;

FIG. 2 graphically provides the illustrative refractive index profile of single mode optical fibers according to a first embodiment of the present disclosure;

FIG. 3 graphically provides the illustrative refractive index profile of single mode optical fibers according to a second embodiment of the present disclosure;

FIGS. 4A, 4B and 4C provide simulation results for macrobending losses and cable cut-off wavelength of exemplary fibers expressed as a function of $f=V_{01}$;

FIGS. 5A, 5B and 5C provide simulation results for macrobending losses and cable cut-off wavelength of exemplary fibers expressed as a function of $f=V_{01}-V_{02}$;

FIGS. 6A to 6G provide simulation results for macrobending losses and cable cut-off wavelength of exemplary fibers expressed as a function of $f=V_{01}-0.2326 \times V_{02}$;

FIG. 7 illustrates an optical link according to an embodiment of the present disclosure.

The components in the figures are not necessarily to scale, emphasis instead being placed upon illustrating the principles of the invention.

5. DETAILED DESCRIPTION

Reference will now be made in detail to embodiments of single mode optical fibers, examples of which are illustrated in the accompanying drawings. Whenever possible, the same reference numerals will be used throughout the drawings to refer to the same or like parts.

One embodiment of a bending-loss insensitive single mode optical fiber according to the present disclosure is schematically depicted in isometric view in FIG. 1. The optical fiber 10 generally has a glass core 101 surrounded by a glass cladding. More precisely, the optical fiber 10 comprises three or four abutting concentric regions, namely:

- a trapezoid core 101, with an outer radius $r_1$;
- an optional intermediate cladding 102, with an inner radius $r_1$ and an outer radius $r_2$;
- a trench, or depressed cladding, 103, with an inner radius $r_2$ and an outer radius $r_3$;
- an outer cladding 104, ranging from an inner radius $r_3$ to the end of the glass part of the fiber, with a refractive index $n_{Cl}$.

In embodiments of the present disclosure with no intermediate cladding 102, the trench 130 directly abuts the core 101, and ranges from an inner radius $r_1$ to an outer radius $r_3$.

In embodiments of the present disclosure, the glass core 101 generally has an outer radius $r_1$ between 5.4 µm and 8.0 µm. Moreover, the depressed cladding 103 has an outer radius $r_3$ between 16 µm and 22 µm. The core 101 has a trapezoid shape, with a small basis radius $r_0$ and a large basis radius $r_1$. The small basis over large basis trapezoid ratio $r_0/r_1$ is ranging from 0.1 to 0.6, typically ranging from about 0.2 to about 0.5, preferably from about 0.25 to about 0.45.

In the embodiments shown and described herein, the core 101 and the cladding generally comprise silica, specifically silica glass. The cross-section of the optical fiber 10 may be generally circular-symmetric with respect to the center of the core 101. In some embodiments described herein, the radius of the glass portion of the optical fiber 10 is about 62.5 µm. However, it should be understood that the dimensions of the cladding may be adjusted so that the radius of the glass portion of the optical fiber may be greater than or less than 62.5 µm. The optical fiber 10 also comprises a coating surrounding the cladding. Such a coating may comprise several layers, and it may notably be a dual-layer coating, although these different layers are not shown on FIG. 1.

The different portions in the cladding may comprise pure silica glass ($SiO_2$), silica glass with one or more dopants, which increase the index of refraction (e.g. $GeO_2$ or any other known dopant), such as when the portion of the cladding is "up-doped" (e.g. for the intermediate cladding 102), or silica glass with a dopant, which decreases the index of refraction, such as fluorine, such as when the portion of the cladding is "down-doped" (e.g. for the trench 103).

The trapezoid shape of the core 101 may be obtained by gradually adjusting the concentration of at least two dopants in the center part of the core.

FIGS. 2 and 3 show diagrams of the index profile of a fibre constituting a first (referenced as Ex1) and a second (referenced as Ex3) embodiment of the invention.

In the first embodiment illustrated by FIG. 2, the index profile is a trapezoid type index profile with a trench, and it presents, starting from the centre of the fibre:
  a centre part of the core having a substantially constant refractive index $n_0$ greater than that of the cladding $n_4$;
  a first annular portion of the core, in which the index decreases in substantially linear manner, from the index $n_0$ of the centre part of the core to the index $n_t$ of the depressed cladding 103. Such an annular portion of the core is also called "transition part" of the core's trapezoid-like index profile, throughout the present document;
  a depressed cladding, or trench 103;
  an outer cladding 104.
The fibre as a whole thus constitutes a fibre having a so-called "trapezoid-like" profile.

The centre part of the core 101 has a radius $r_0$ and an index difference $\Delta n_0$ relative to the outer cladding. In the transition part of the core, the refractive index difference decreases substantially linearly. The refractive index of the core typically has a trapezoid shape. Accordingly, the refractive-index difference $\Delta n(r)$ between the central core and the outer cladding depends on the distance r from the centre of the optical fibre (e.g. decreasing as the distance from the centre of the optical fibre increases). As used herein, the term "refractive-index difference" does not exclude a refractive-index difference of zero.

The depressed cladding, or buried trench, 103 has a radius $r_3$ and a refractive-index difference $\Delta n_t$ with respect to the outer cladding that is typically constant. As used herein, the term "buried trench" is used to designate a radial portion of the optical fibre having a refractive index lower than the refractive index of the outer cladding.

The outer cladding 104 ranges from a radius $r_3$ to the end of the glass part of the single mode fibre.

In the second embodiment illustrated by FIG. 3, the index profile is a trapezoid type index profile with a trench, and it presents, starting from the centre of the fibre:
  a centre part of the core having a substantially constant refractive index $n_0$ greater than that of the cladding $n_4$;
  a first annular portion of the core, in which the index decreases in substantially linear manner, from the index $n_0$ of the centre part of the core to the index $n_2$ of the intermediate cladding 102. Such an annular portion of the core is also called "transition part" of the core's trapezoid-like index profile, throughout the present document;
  an intermediate cladding 102;
  a depressed cladding, or trench 103;
  an outer cladding 104.
The fibre as a whole thus constitutes a fibre having a so-called "trapezoid-like" profile.

Like in the embodiment of FIG. 2, the centre part of the core 101 has a radius $r_0$ and an index difference $\Delta n_0$ relative to the outer cladding. In the transition part of the core, the refractive index difference decreases substantially linearly. The refractive index of the core typically has a trapezoid shape. Accordingly, the refractive-index difference $\Delta n(r)$ between the central core and the outer cladding depends on the distance r from the centre of the optical fibre (e.g. decreasing as the distance from the centre of the optical fibre increases). As used herein, the term "refractive-index difference" does not exclude a refractive-index difference of zero.

The intermediate cladding 102 has a radius $r_2$ and a refractive-index difference $\Delta n_e$ with respect to the outer cladding that is typically constant. In the peculiar embodiment illustrated by FIG. 3, $\Delta n_2=0$. However, in other embodiments, this refractive-index difference may be different from zero (see exemplary embodiment Ex4 described later on in this document). The depressed cladding, or buried trench, 103 has a radius $r_3$ and a refractive-index difference $\Delta n_t$ with respect to the outer cladding that is typically constant. As used herein, the term "buried trench" is used to designate a radial portion of the optical fibre having a refractive index lower than the refractive index of the outer cladding.

The outer cladding 104 ranges from a radius $r_3$ to the end of the glass part of the single mode fibre.

FIGS. 2 and 3 differ from each other by the presence of an intermediate cladding 102 between the trapezoid core and the trench.

In both FIGS. 2 and 3, refractive indexes n(r) are given at a 633 nm wavelength (i.e. the wavelength at which the profile is measured thanks to commercial apparatus) relatively to the outer cladding index $n_4$. These indexes are thus also called "index delta". More generally, throughout the present document, all refractive indices are given at a wavelength $\lambda=633$ nm.

Table 2 below draws a comparison of the refractive index designs of two exemplary embodiments Ex1 and Ex2 of FIG. 2 with an equivalent step index single mode fibre Comp Ex. The values in Table 2 correspond to the theoretical refractive-index profiles.

TABLE 2

|  | ratio $r_0/r_1$ | r1 (µm) | r3 (µm) | $\Delta n_0 \times 1000$ | $\Delta n_t \times 1000$ |
|---|---|---|---|---|---|
| Comp Ex | 1 | 4.34 | 17.50 | 5.29 | −0.16 |
| Ex1 | 0.35 | 6.90 | 17.50 | 5.54 | −1.23 |
| Ex2 | 0.35 | 6.88 | 20.00 | 5.41 | −1.35 |

The first column of Table 2 lists the exemplary and comparative optical fibres. The following columns provide, for each single mode fibre listed in the first column:
the ratio $r_0/r_1$ of the centre part of the core radius to the transition part of the core outer radius;
the outer radius $r_1$ of the transition part of the core, expressed in µm;
the outer radius $r_3$ of the trench, expressed in µm;
the index delta $\Delta n_0$ of the centre part of the core;
the index delta $\Delta n_t$ of the trench.

The refractive index differences in Table 2 (as well as in all the other tables throughout the present document) have been multiplied by 1000, as are the ordinate values in FIGS. 2 and 3 (for example, for the first exemplary embodiment of the invention Ex1, the index delta of the centre part of the core is $5.29 \times 10^{-3}$). The refractive-index values were measured at a wavelength of 633 nanometres.

Table 3 below details the refractive index design of exemplary embodiments Ex3 and Ex4 of FIG. 3. The values in Table 3 correspond to the theoretical refractive-index profiles. It must be noted that the overall refractive-index profile of exemplary embodiment Ex4 corresponds to the one depicted in FIG. 3, except for the fact that the refractive index difference of the intermediate cladding is not zero.

TABLE 3

|  | Ratio $r_0/r_1$ | $r_1$ (µm) | $r_2$ (µm) | $r_3$ (µm) | $\Delta n_0 \times 1000$ | $\Delta n_2 \times 1000$ | $\Delta n_t \times 1000$ |
|---|---|---|---|---|---|---|---|
| Ex3 | 0.35 | 5.91 | 10.00 | 17.50 | 5.77 | 0.00 | −1.75 |
| Ex4 | 0.35 | 5.78 | 10.00 | 17.50 | 5.87 | 0.20 | −2.00 |

The first column of Table 3 gives the reference of the exemplary optical fibres. The following columns provide for the single mode fibres listed in the first column:
the ratio $r_0/r_1$ of the centre part of the core radius to the transition part of the core outer radius;
the outer radius $r_1$ of the transition part of the core, expressed in µm;
the outer radius $r_2$ of the intermediate cladding, expressed in µm;
the outer radius $r_3$ of the trench, expressed in µm;
the index delta $\Delta n_0$ of the centre part of the core;
the index delta $\Delta n_2$ of the intermediate cladding;
the index delta $\Delta n_t$ of the trench.

Both in the embodiments of FIGS. 2 and 3, the core index $\Delta n_0$ is typically ranging from about $5.0 \times 10^{-3}$ to about $6.0 \times 10^{-3}$; the trench index $\Delta n_t$ is typically ranging from about $2.0 \times 10^{-3}$ to about $0.9 \times 10^{-3}$.

Table 4 (below) shows optical transmission characteristics for optical single mode fibres having the refractive-index profiles depicted in Table 2 and Table 3, compared with the optical transmission characteristics recommended in the ITU-T G.657.A2 standard. The first column identifies the minimum and maximum G.657.A2 recommended range, and the exemplary and comparative optical fibres. The next columns provide, for each optical fibre:
the Cable Cut-off wavelength (CCO) expressed in nm;
the Mode Field Diameter at 1310 nm (MFD 1310) expressed in µm;
the Mode Field Diameter at 1550 nm (MFD 1550) expressed in µm;
the Zero chromatic Dispersion Wavelength (ZDW) expressed in nm;
the Zero Dispersion Slope (ZDS) expressed in ps/nm²-km;
the Chromatic Dispersion at respective 1550 nm (DC 1550) and 1625 nm (DC 1625) wavelength expressed in ps/nm-km.

TABLE 4

|  | CCO (nm) | MFD 1310 (µm) | MFD 1550 (µm) | ZDW (nm) | ZDS (ps/nm²-km) | DC 1550 (ps/nm-km) | DC 1625 (ps/nm-km) |
|---|---|---|---|---|---|---|---|
| G.657.A2 min |  | 8.6 |  | 1300 |  | 13.3 | 17.2 |
| G.657.A2 max | 1260 | 9.2 |  | 1324 | 0.092 | 18.6 | 23.7 |
| Comp Ex | 1210 | 9 | 10.11 | 1312 | 0.086 | 16.5 | 20.7 |
| Ex1 | 1210 | 9 | 10.05 | 1312 | 0.090 | 17.4 | 21.7 |
| Ex2 | 1210 | 9 | 10.06 | 1312 | 0.090 | 17.4 | 21.7 |
| Ex3 | 1210 | 9 | 10.23 | 1317 | 0.090 | 17.2 | 21.8 |
| Ex4 | 1228 | 9 | 10.25 | 1320 | 0.090 | 17.1 | 21.7 |

The comparative example Comp Ex, corresponding to a step-index single mode fibre, presents the same MFD at 1310 nm and Cable Cut-off as examples Ex1 to Ex3. However, examples Ex1 to Ex4 are all compliant with ITU-T G.657.A2 Recommendation, which is not the case of the comparative example Comp Ex.

It must be noted that the cable cutoff target needs to be significantly below the maximum accepted level of 1260 nm. Targeting a cable cutoff at 1260 nm is not robust as it will by definition induce 50% of the production out of the ranges of values recommended by the G.657.A2 standard. In the above examples, the cable cutoff wavelength is targeted to be around 1210 nm that is ensuring robust production, i.e nearly all fibers can pass the cable cutoff recommendation. More generally, targeting cable cutoff below 1240 nm is recommended to ensure a robust production.

As may be observed in Table 4, all the exemplary fibers Ex1 to Ex4 target a nominal Mode Field Diameter at 1310 nm of 9 microns.

Table 5 (below) shows macrobending losses for optical fibres having the refractive-index profiles depicted in Tables 2 and 3 for the wavelengths of 1550 nanometres and 1625 nanometres for radii of curvature of 15 millimetres, 10 millimetres, 7.5 millimetres and 5 millimetres, such as:

R15 mm Macro bend loss at 1550 nm (R15BL at 1550), expressed in dB/10T, where 10T stands for 10 turns;
R10 mm Macro bend loss at 1550 nm (R10BL at 1550), expressed in dB/1T, where 1T stands for 1 turn;
R7.5 mm Macro bend loss at 1550 nm (R7.5BL at 1550), expressed in dB/1T, where 1T stands for 1 turn;
R5 mm Macro bend loss at 1550 nm (R5BL at 1550), expressed in dB/1T, where 1T stands for 1 turn;
R15 mm Macro bend loss at 1625 nm (R15BL at 1625), expressed in dB/10T, where 10T stands for 10 turns;
R10 mm Macro bend loss at 1625 nm (R10BL at 1625), expressed in dB/1T, where 1T stands for 1 turn;
R7.5 mm Macro bend loss at 1625 nm (R7.5BL at 1625), expressed in dB/1T, where 1T stands for 1 turn;
R5 mm Macro bend loss at 1625 nm (R5BL at 1625), expressed in dB/1T, where 1T stands for 1 turn.

Table 5 also provides the maximum recommended value by the ITU-T G.657.A2 standard.

TABLE 5

| | R15BL at 1550 (dB/10T) | R10BL at 1550 (dB/1T) | R7.5BL at 1550 (dB/1T) | R5BL at 1550 (dB/1T) | R15BL at 1625 (dB/10T) | R10BL at 1625 (dB/1T) | R7.5BL at 1625 (dB/1T) | R5BL at 1625 (dB/1T) |
|---|---|---|---|---|---|---|---|---|
| G.657.A2 max | 0.03 | 0.1 | 0.5 | | 0.1 | 0.2 | 1.0 | |
| Comp Ex | 0.022 | 0.17 | 1.3 | 10 | 0.14 | 0.55 | 3.0 | 16 |
| Ex1 | 0.013 | 0.05 | 0.3 | 1.4 | 0.08 | 0.17 | 0.6 | 2.6 |
| Ex2 | 0.016 | 0.04 | 0.1 | 1.0 | 0.08 | 0.10 | 0.3 | 1.8 |
| Ex3 | 0.016 | 0.06 | 0.3 | 1.3 | 0.08 | 0.16 | 0.6 | 2.4 |
| Ex4 | 0.009 | 0.04 | 0.2 | 0.9 | 0.05 | 0.11 | 0.4 | 1.7 |

In accordance with Tables 4 and 5 (above), the optical fibres according to embodiments of the invention show bending losses, which are less than the comparative optical fibre, which has a step-index profile.

The four refractive index profile examples Ex1, Ext, Ex3 and Ex4 according to embodiments of the invention, described in Tables 2 to 5, as well as in FIGS. 1 and 2, comply with the ITU-T G. 657.A2 Recommendation.

Table 6 below provides the features of three other exemplary optical fibres Ex5 to Ex7, which refractive index profile corresponds to the one depicted in FIG. 2, but which, contrarily to the exemplary fibres of Table 2, target a MFD at 1310 nm of 9.2 microns.

TABLE 6

| | ratio r0/r1 | r1 (μm) | r3 (μm) | $\Delta n_0 \times 1000$ | $\Delta n_t \times 1000$ |
|---|---|---|---|---|---|
| Ex5 | 0.35 | 7.00 | 17.50 | 5.5 | −0.93 |
| Ex6 | 0.35 | 6.99 | 20.00 | 5.41 | −1 |
| Ex7 | 0.35 | 6.97 | 20.00 | 5.29 | −1.1 |

The structure and units of Table 6 is identical to that of Table 2 and is therefore not detailed here. Similarly, Table 7 below corresponds to Table 4 above and provides the optical characteristics of exemplary optical fibres Ex5-Ex7; Table 8 below corresponds to Table 5 above and provides the macrobending losses of exemplary optical fibres Ex5-Ex7.

TABLE 7

| | CCO (nm) | MFD 1310 (μm) | MFD 1550 (μm) | ZDW (nm) | ZDS (ps/nm²-km) | DC 1550 (ps/nm-km) | DC 1625 (ps/nm-km) |
|---|---|---|---|---|---|---|---|
| G.657.A2 min | | 8.6 | | 1300 | | 13.3 | 17.2 |
| G.657.A2 max | 1260 | 9.2 | | 1324 | 0.092 | 18.6 | 23.7 |

TABLE 7-continued

|     | CCO (nm) | MFD 1310 (μm) | MFD 1550 (μm) | ZDW (nm) | ZDS (ps/nm²-km) | DC 1550 (ps/nm-km) | DC 1625 (ps/nm-km) |
|-----|----------|---------------|---------------|----------|-----------------|--------------------|--------------------|
| Ex5 | 1236     | 9.2           | 10.29         | 1312     | 0.090           | 17.4               | 21.8               |
| Ex6 | 1235     | 9.2           | 10.29         | 1312     | 0.090           | 17.4               | 21.8               |
| Ex7 | 1214     | 9.2           | 10.29         | 1312     | 0.090           | 17.4               | 21.7               |

TABLE 8

|            | R15BL at 1550 (dB/10T) | R10BL at 1550 (dB/1T) | R7.5BL at 1550 (dB/1T) | R5BL at 1550 (dB/1T) | R15BL at 1625 (dB/10T) | R10BL at 1625 (dB/1T) | R7.5BL at 1625 (dB/1T) | R5BL at 1625 (dB/1T) |
|------------|------------------------|-----------------------|------------------------|----------------------|------------------------|-----------------------|------------------------|----------------------|
| G.657.A2 max | 0.03                 | 0.1                   | 0.5                    |                      | 0.1                    | 0.2                   | 1.0                    |                      |
| Ex5        | 0.012                  | 0.07                  | 0.4                    | 2.4                  | 0.07                   | 0.20                  | 0.9                    | 4.1                  |
| Ex6        | 0.013                  | 0.05                  | 0.2                    | 1.7                  | 0.07                   | 0.14                  | 0.5                    | 3.2                  |
| Ex7        | 0.025                  | 0.06                  | 0.3                    | 1.8                  | 0.12                   | 0.17                  | 0.6                    | 3.3                  |

We now present interesting tools and methods for defining acceptable profile ranges for single mode optical fibres according to the present disclosure.

Each section of the optical fibre profile may be defined using surface integrals. The term "surface" should not be understood geometrically but rather should be understood as a value having two dimensions.

Accordingly, the central core may define a surface integral $V_{01}$ and the cladding may define a surface integral $V_{02}$ respectively defined by the following equations:

$$V_{01} = \int_0^{r_1} \Delta n(r) \cdot dr \approx \frac{\Delta n_0(r_1 + r_0) + \Delta n_2(r_1 - r_0)}{2}$$

$$V_{02} = \int_{r_1}^{\infty} \Delta n(r) \cdot dr \approx (r_2 - r_1) \times \Delta n_2 + (r_3 - r_2) \times \Delta n_t$$

For exemplary optical fibres which refractive index profile corresponds to the first embodiment of FIG. 2, the cladding surface integral may be expressed as:

$$V_{02} \approx (r_3 - r_2) \times \Delta n_t$$

Table 9 (below) completes Tables 2, 3 and 6 (above) with the values of the surface integrals $V_{01}$ and $V_{02}$ described above for the exemplary embodiments of the invention Ex1 to Ex7, as well as for their comparative step index single mode fibre Comp Ex. All the examples in Table 9 are hence the same as in Tables 2, 3 and 6. The values in Table 9 correspond to the theoretical refractive-index profiles.

The first column in Table 9 lists the exemplary and comparative optical fibres. The three other columns provide respective values for the surface integrals $V_{01}$ and $V_{02}$, as well as for the polynomial $V_{01} - 0.2326 V_{02}$. The integrals in Table 9 have been multiplied by 1000.

TABLE 9

|         | $V_{01} \times 1000$ (μm) | $V_{02} \times 1000$ (μm) | $(V_{01} - 0.2326 V_{02}) \times 1000$ (μm) |
|---------|---------------------------|---------------------------|---------------------------------------------|
| Comp Ex | 22.96                     | -2.11                     | 23.45                                       |
| Ex1     | 23.04                     | -13.04                    | 26.08                                       |
| Ex2     | 22.11                     | -17.71                    | 26.23                                       |
| Ex3     | 23.02                     | -13.13                    | 26.07                                       |
| Ex4     | 23.27                     | -14.16                    | 26.56                                       |

TABLE 9-continued

|     | $V_{01} \times 1000$ (μm) | $V_{02} \times 1000$ (μm) | $(V_{01} - 0.2326 V_{02}) \times 1000$ (μm) |
|-----|---------------------------|---------------------------|---------------------------------------------|
| Ex5 | 23.87                     | -9.77                     | 26.14                                       |
| Ex6 | 23.25                     | -13.01                    | 26.28                                       |
| Ex7 | 22.40                     | -14.33                    | 25.73                                       |

Tables 10 to 13 (below) provide the features of further exemplary optical fibres Ex8 to Ex35, according to embodiments of the present disclosure, which refractive index profile corresponds to the one depicted in FIG. 2. More precisely, Table 10 corresponds to Table 6, and provides:

- the ratio $r_0/r_1$ of the centre part of the core radius to the transition part of the core outer radius;
- the outer radius $r_1$ of the transition part of the core, expressed in μm;
- the outer radius $r_3$ of the trench, expressed in μm;
- the index delta $\Delta n_0$ of the centre part of the core;
- the index delta $\Delta n_t$ of the trench.

TABLE 10

|      | ratio r0/r1 | r1 (μm) | r3 (μm) | $\Delta n_0 \times 1000$ | $\Delta n_t \times 1000$ |
|------|-------------|---------|---------|--------------------------|--------------------------|
| Ex8  | 0.20        | 8.00    | 20.00   | 5.59                     | -1.91                    |
| Ex9  | 0.20        | 7.90    | 21.43   | 5.61                     | -1.65                    |
| Ex10 | 0.25        | 7.65    | 17.30   | 5.70                     | -1.48                    |
| Ex11 | 0.25        | 7.85    | 18.12   | 5.55                     | -1.62                    |
| Ex12 | 0.25        | 7.43    | 21.49   | 5.61                     | -1.13                    |
| Ex13 | 0.25        | 7.95    | 16.05   | 5.80                     | -1.99                    |
| Ex14 | 0.25        | 7.33    | 18.16   | 5.79                     | -1.31                    |
| Ex15 | 0.30        | 7.21    | 17.94   | 5.56                     | -1.19                    |
| Ex16 | 0.30        | 7.56    | 20.73   | 5.12                     | -1.84                    |
| Ex17 | 0.30        | 7.42    | 17.03   | 5.49                     | -1.78                    |
| Ex18 | 0.30        | 7.06    | 19.52   | 5.70                     | -1.15                    |
| Ex19 | 0.35        | 7.06    | 20.80   | 5.35                     | -1.38                    |
| Ex20 | 0.35        | 6.78    | 21.74   | 5.48                     | -0.92                    |
| Ex21 | 0.35        | 6.91    | 19.96   | 5.39                     | -0.94                    |
| Ex22 | 0.35        | 7.25    | 18.93   | 5.28                     | -1.98                    |
| Ex23 | 0.35        | 6.90    | 21.93   | 5.28                     | -1.49                    |
| Ex24 | 0.40        | 6.67    | 19.57   | 5.33                     | -1.06                    |
| Ex25 | 0.40        | 6.98    | 18.60   | 5.21                     | -1.37                    |
| Ex26 | 0.40        | 7.01    | 16.51   | 5.42                     | -1.70                    |
| Ex27 | 0.40        | 6.43    | 21.55   | 5.43                     | -0.91                    |
| Ex28 | 0.45        | 6.42    | 19.71   | 5.33                     | -0.91                    |
| Ex29 | 0.45        | 6.55    | 18.98   | 5.26                     | -0.97                    |
| Ex30 | 0.45        | 6.68    | 19.60   | 5.06                     | -1.83                    |

TABLE 10-continued

|  | ratio r0/r1 | r1 (μm) | r3 (μm) | $\Delta n_0 \times 1000$ | $\Delta n_t \times 1000$ |
|---|---|---|---|---|---|
| Ex31 | 0.45 | 6.35 | 20.79 | 5.24 | −1.16 |
| Ex32 | 0.50 | 6.23 | 19.23 | 5.19 | −1.02 |
| Ex33 | 0.50 | 6.37 | 20.49 | 5.01 | −1.18 |
| Ex34 | 0.50 | 6.34 | 18.48 | 5.11 | −1.50 |
| Ex35 | 0.50 | 6.10 | 21.63 | 5.33 | −0.93 |

Similarly, Table 11 below corresponds to Table 4 above and provides the optical characteristics of exemplary optical fibres Ex8-Ex35; Table 12 below corresponds to Table 5 above and provides the macrobending losses of exemplary optical fibres Ex8-Ex35. Last, Table 13 below corresponds to Table 9 above and provides the values of the surface integrals $V_{O1}$ and $V_{O2}$ described above for the exemplary embodiments of the invention Ex8 to Ex35. The structure and units in Tables 10-13 are the same as in the previously described corresponding tables.

TABLE 11

|  | CCO (nm) | MFD 1310 (μm) | MFD 1550 (μm) | ZDW (nm) | ZDS (ps/nm²-km) | DC 1550 (ps/nm-km) | DC 1625 (ps/nm-km) |
|---|---|---|---|---|---|---|---|
| G.657.A2 min |  | 8.6 |  | 1300 |  | 13.3 | 17.2 |
| G.657.A2 max | 1260 | 9.2 |  | 1324 | 0.092 | 18.6 | 23.7 |
| Ex8 | 1223 | 9.12 | 10.23 | 1318 | 0.091 | 17.3 | 21.7 |
| Ex9 | 1240 | 9.18 | 10.32 | 1319 | 0.091 | 17.1 | 21.5 |
| Ex10 | 1219 | 9.11 | 10.21 | 1316 | 0.091 | 17.3 | 21.7 |
| Ex11 | 1228 | 9.20 | 10.29 | 1314 | 0.091 | 17.5 | 21.9 |
| Ex12 | 1234 | 9.19 | 10.34 | 1318 | 0.090 | 17 | 21.4 |
| Ex13 | 1231 | 9.01 | 10.05 | 1313 | 0.092 | 17.6 | 22 |
| Ex14 | 1202 | 9.00 | 10.12 | 1319 | 0.090 | 17 | 21.3 |
| Ex15 | 1214 | 9.11 | 10.21 | 1315 | 0.090 | 17.3 | 21.6 |
| Ex16 | 1234 | 9.19 | 10.26 | 1310 | 0.091 | 17.7 | 22.1 |
| Ex17 | 1197 | 9.01 | 10.05 | 1311 | 0.091 | 17.6 | 22 |
| Ex18 | 1224 | 9.00 | 10.10 | 1316 | 0.090 | 17.1 | 21.4 |
| Ex19 | 1239 | 9.11 | 10.16 | 1310 | 0.091 | 17.6 | 21.9 |
| Ex20 | 1230 | 9.10 | 10.22 | 1315 | 0.089 | 17.1 | 21.4 |
| Ex21 | 1225 | 9.20 | 10.31 | 1313 | 0.090 | 17.3 | 21.6 |
| Ex22 | 1230 | 9.00 | 10.00 | 1306 | 0.092 | 18 | 22.4 |
| Ex23 | 1231 | 9.00 | 10.06 | 1311 | 0.090 | 17.4 | 21.7 |
| Ex24 | 1222 | 9.11 | 10.17 | 1310 | 0.090 | 17.5 | 21.8 |
| Ex25 | 1234 | 9.20 | 10.22 | 1305 | 0.091 | 18 | 22.3 |
| Ex26 | 1235 | 9.01 | 9.98 | 1303 | 0.092 | 18.2 | 22.6 |
| Ex27 | 1215 | 9.00 | 10.10 | 1314 | 0.089 | 17.1 | 21.4 |
| Ex28 | 1232 | 9.11 | 10.16 | 1308 | 0.090 | 17.5 | 21.8 |
| Ex29 | 1238 | 9.20 | 10.24 | 1306 | 0.090 | 17.8 | 22.1 |
| Ex30 | 1232 | 9.01 | 9.96 | 1301 | 0.092 | 18.3 | 22.6 |
| Ex31 | 1216 | 9.01 | 10.05 | 1308 | 0.089 | 17.5 | 21.8 |
| Ex32 | 1224 | 9.10 | 10.12 | 1305 | 0.090 | 17.7 | 22 |
| Ex33 | 1231 | 9.20 | 10.21 | 1303 | 0.091 | 18 | 22.3 |
| Ex34 | 1216 | 9.00 | 9.97 | 1301 | 0.091 | 18.2 | 22.5 |
| Ex35 | 1236 | 9.00 | 10.03 | 1307 | 0.089 | 17.5 | 21.8 |

TABLE 12

|  | R15BL at 1550 (dB/10T) | R10BL at 1550 (dB/1T) | R7.5BL at 1550 (dB/1T) | R5BL at 1550 (dB/1T) | R15BL at 1625 (dB/10T) | R10BL at 1625 (dB/1T) | R7.5BL at 1625 (dB/1T) | R5BL at 1625 (dB/1T) |
|---|---|---|---|---|---|---|---|---|
| G.657.A2 max | 0.03 | 0.1 | 0.5 |  | 0.1 | 0.2 | 1.0 |  |
| Ex8 | 0.021 | 0.03 | 0.1 | 0.5 | 0.10 | 0.07 | 0.19 | 0.89 |
| Ex9 | 0.016 | 0.02 | 0.1 | 0.6 | 0.07 | 0.06 | 0.18 | 1.19 |
| Ex10 | 0.014 | 0.05 | 0.2 | 1.2 | 0.08 | 0.15 | 0.53 | 2.11 |
| Ex11 | 0.014 | 0.04 | 0.2 | 0.9 | 0.07 | 0.12 | 0.38 | 1.58 |
| Ex12 | 0.015 | 0.04 | 0.2 | 1.5 | 0.07 | 0.10 | 0.37 | 2.79 |
| Ex13 | 0.005 | 0.03 | 0.1 | 0.7 | 0.03 | 0.09 | 0.34 | 1.29 |
| Ex14 | 0.016 | 0.05 | 0.2 | 1.3 | 0.09 | 0.16 | 0.54 | 2.42 |
| Ex15 | 0.017 | 0.06 | 0.3 | 1.7 | 0.10 | 0.19 | 0.67 | 2.94 |
| Ex16 | 0.023 | 0.02 | 0.1 | 0.5 | 0.10 | 0.06 | 0.18 | 0.97 |
| Ex17 | 0.018 | 0.05 | 0.2 | 0.9 | 0.10 | 0.15 | 0.44 | 1.58 |
| Ex18 | 0.009 | 0.04 | 0.2 | 1.2 | 0.05 | 0.11 | 0.41 | 2.18 |
| Ex19 | 0.010 | 0.02 | 0.1 | 0.8 | 0.05 | 0.07 | 0.23 | 1.47 |
| Ex20 | 0.012 | 0.04 | 0.2 | 2.1 | 0.07 | 0.12 | 0.47 | 3.92 |
| Ex21 | 0.019 | 0.06 | 0.3 | 2.2 | 0.10 | 0.18 | 0.66 | 3.90 |
| Ex22 | 0.011 | 0.02 | 0.1 | 0.4 | 0.06 | 0.06 | 0.17 | 0.70 |
| Ex23 | 0.014 | 0.02 | 0.1 | 0.7 | 0.07 | 0.06 | 0.19 | 1.44 |
| Ex24 | 0.016 | 0.05 | 0.2 | 1.6 | 0.09 | 0.15 | 0.55 | 2.93 |
| Ex25 | 0.013 | 0.04 | 0.2 | 1.0 | 0.07 | 0.12 | 0.41 | 1.88 |

TABLE 12-continued

|      | R15BL at 1550 (dB/10T) | R10BL at 1550 (dB/1T) | R7.5BL at 1550 (dB/1T) | R5BL at 1550 (dB/1T) | R15BL at 1625 (dB/10T) | R10BL at 1625 (dB/1T) | R7.5BL at 1625 (dB/1T) | R5BL at 1625 (dB/1T) |
|------|------|------|------|------|------|------|------|------|
| Ex26 | 0.006 | 0.03 | 0.2 | 0.8 | 0.04 | 0.09 | 0.36 | 1.43 |
| Ex27 | 0.015 | 0.04 | 0.2 | 2.2 | 0.08 | 0.13 | 0.51 | 4.16 |
| Ex28 | 0.011 | 0.05 | 0.2 | 1.9 | 0.07 | 0.15 | 0.59 | 3.48 |
| Ex29 | 0.012 | 0.05 | 0.3 | 1.9 | 0.07 | 0.16 | 0.63 | 3.34 |
| Ex30 | 0.013 | 0.02 | 0.1 | 0.4 | 0.07 | 0.06 | 0.17 | 0.79 |
| Ex31 | 0.017 | 0.04 | 0.2 | 1.3 | 0.09 | 0.11 | 0.38 | 2.54 |
| Ex32 | 0.016 | 0.06 | 0.3 | 1.7 | 0.09 | 0.17 | 0.61 | 3.13 |
| Ex33 | 0.019 | 0.04 | 0.2 | 1.4 | 0.10 | 0.13 | 0.42 | 2.57 |
| Ex34 | 0.017 | 0.04 | 0.2 | 0.8 | 0.09 | 0.12 | 0.37 | 1.59 |
| Ex35 | 0.008 | 0.03 | 0.2 | 1.6 | 0.05 | 0.09 | 0.38 | 3.20 |

TABLE 13

|      | $V_{01} \times 1000$ (µm) | $V_{02} \times 1000$ (µm) | $(V_{01} - 0.2326 V_{02}) \times 1000$ (µm) |
|------|------|------|------|
| Comp Ex | 22.96 | −2.11 | 23.45 |
| Ex8  | 20.72 | −22.92 | 26.05 |
| Ex9  | 21.38 | −22.32 | 26.57 |
| Ex10 | 23.01 | −14.28 | 26.33 |
| Ex11 | 22.46 | −16.64 | 26.33 |
| Ex12 | 22.90 | −15.89 | 26.60 |
| Ex13 | 22.89 | −16.12 | 26.64 |
| Ex14 | 22.92 | −14.19 | 26.22 |
| Ex15 | 23.05 | −12.77 | 26.02 |
| Ex16 | 20.29 | −24.23 | 25.93 |
| Ex17 | 21.86 | −17.11 | 25.83 |
| Ex18 | 23.32 | −14.33 | 26.65 |
| Ex19 | 22.33 | −18.96 | 26.74 |
| Ex20 | 23.05 | −13.76 | 26.25 |
| Ex21 | 23.03 | −12.27 | 25.88 |
| Ex22 | 21.17 | −23.13 | 26.55 |
| Ex23 | 21.25 | −22.39 | 26.46 |
| Ex24 | 22.76 | −13.67 | 25.95 |
| Ex25 | 22.59 | −15.92 | 26.29 |
| Ex26 | 23.02 | −16.15 | 26.78 |
| Ex27 | 22.69 | −13.76 | 25.89 |
| Ex28 | 23.20 | −12.09 | 26.01 |
| Ex29 | 23.23 | −12.06 | 26.04 |
| Ex30 | 21.14 | −23.64 | 26.64 |
| Ex31 | 22.10 | −16.75 | 25.99 |
| Ex32 | 22.66 | −13.26 | 25.75 |
| Ex33 | 22.06 | −16.66 | 25.93 |
| Ex34 | 21.92 | −18.21 | 26.16 |
| Ex35 | 22.97 | −14.44 | 26.33 |

Optical fibres according to embodiments of the invention typically target a MFD at 1310 nm greater than or equal to 9 microns, and have the following properties:
  a ratio $r_0/r_1$ of the centre part of the core's radius to the transition part of the core's radius ranges between 0.10 and 0.60 (which is required to keep the Zero chromatic Dispersion Wavelength ZDW between 1300 and 1324 nm), preferably ranging between 0.20 and 0.50, more preferably between 0.25 and 0.45 (which provides a robust working range);
  a core surface integral $V_{01}$ preferably ranging between about $20 \times 10^{-3}$ µm and about $24 \times 10^{-3}$ µm;
  a cladding surface integral $V_{02}$ preferably ranging between $-25 \times 10^{-3}$ µm and $-9 \times 10^{-3}$ µm;
  the relationship $V_{01} - 0.2326 \times V_{02}$ between the core surface integral and the cladding surface integral preferably ranging between $25.7 \times 10^{-3}$ µm and $26.8 \times 10^{-3}$ µm.

Actually, it is known that macrobending losses decrease when the core surface integral $V_{01}$ increases and when the cladding surface integral $V_{02}$ decreases. The inventors have hence worked out that there must be a positive number k, which allows describing macrobending losses by a mathematical function of the type:

$$f = V_{01} - k \times V_{02}.$$

The same reasoning applies with the cable cutoff wavelength, which tends to increase when the core surface integral $V_{01}$ increases and when the cladding surface integral $V_{02}$ decreases. Hence, there must also be a positive number g, which allows describing the behaviour of the cable cut off wavelength by a mathematical function of the type:

$$f = V_{01} - g \times V_{02}.$$

By trial and error, the inventors have found out that for k=g=0.2326, there is a strong correlation between the f function and the macrobending losses at bending radii of 15 mm and 10 mm on the one hand, and the cable cut-off wavelength on the other hand.

FIGS. 4 to 6 allow illustrating this finding. More precisely, FIGS. 4A and 4B respectively illustrate on the y-axis, the macrobending losses, for optical fibres according to embodiments of the present disclosure targeting a MFD at 1310 nm of 9 microns for the wavelength of 1550 nanometres for radii of curvature of 15 millimetres and 10 millimetres (R15BL at 1550 and R10BL at 1550), expressed in dB/10T, where 10T stands for 10 turns, as a function of the above-expressed f function, when k=0, on the x-axis. FIG. 4C illustrates the cable cut-off wavelength (CCO), expressed in nm, for optical fibres according to embodiments of the present disclosure targeting a MFD at 1310 nm of 9 microns, as a function of the above-expressed f function, when g=0, on the x-axis.

As may be observed, the values of macrobending losses and cable cut-off wavelength are dispersed.

The same may be observed on FIGS. 5A to 5C, which are similar to FIGS. 4A to 4C, except for the fact that the k and g parameters are set to 1.

However, FIGS. 6A to 6G illustrate the fact that there is a strong correlation between the above-expressed f function and both the macrobending losses and the cable cut-off wavelength when k=g=0.2326. All these figures are plotted through simulations carried out for exemplary optical fibres according to the present disclosure, both targeting a MFD at 1310 nm of 9 or 9.2 microns, corresponding to the lower and upper limits of the present disclosure.

Figures 6A, 6B, 6C:
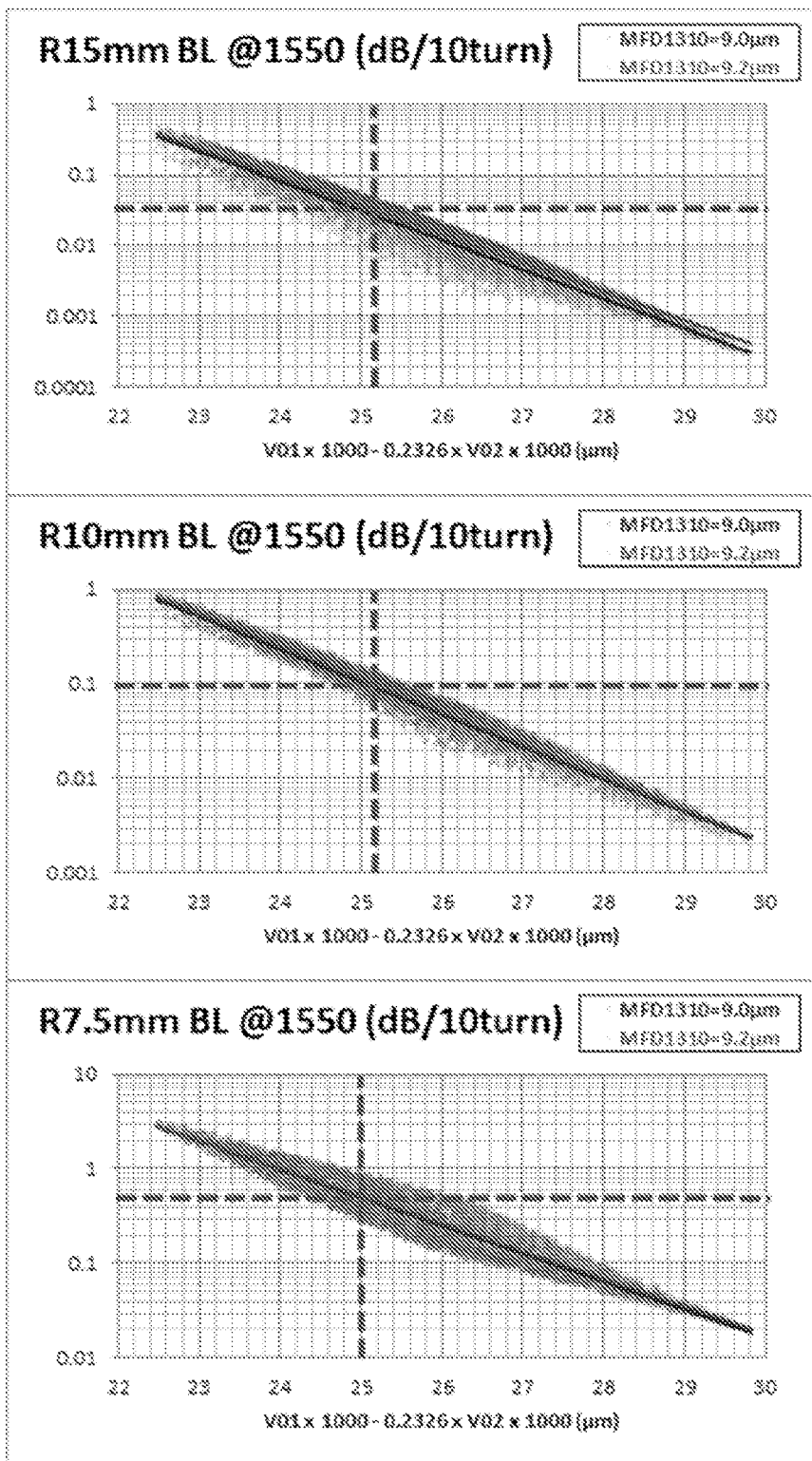

FIG. 6A provides the macrobending losses for such optical fibres for the wavelength of 1550 nanometres for a radius of curvature of 15 millimetres (R15 mm BL at 1550), expressed in dB/10T, where 10T stands for 10 turns, as a function of the above-expressed f function, when k=0.2326, on the x-axis.

FIG. 6B provides the macrobending losses for such optical fibres for the wavelength of 1550 nanometres for a radius of curvature of 10 millimetres (R10 mm BL at 1550), expressed in dB/10T, where 10T stands for 10 turns, as a function of the above-expressed f function, when k=0.2326, on the x-axis.

FIG. 6C provides the macrobending losses for such optical fibres for the wavelength of 1550 nanometres for a radius of curvature of 7.5 millimetres (R7.5 mm BL at 1550), expressed in dB/10T, where 10T stands for 10 turns, as a function of the above-expressed f function, when k=0.2326, on the x-axis.

FIG. 6D provides the macrobending losses for such optical fibres for the wavelength of 1625 nanometres for a radius of curvature of 15 millimetres (R15 mm BL at 1625), expressed in dB/10T, where 10T stands for 10 turns, as a function of the above-expressed f function, when k=0.2326, on the x-axis.

FIG. 6E provides the macrobending losses for such optical fibres for the wavelength of 1625 nanometres for a radius of curvature of 10 millimetres (R10 mm BL at 1625), expressed in dB/10T, where 10T stands for 10 turns, as a function of the above-expressed f function, when k=0.2326, on the x-axis.

FIG. 6F provides the macrobending losses for such optical fibres for the wavelength of 1625 nanometres for a radius of curvature of 7.5 millimetres (R7.5 mm BL at 1625), expressed in dB/10T, where 10T stands for 10 turns, as a function of the above-expressed f function, when k=0.2326, on the x-axis.

FIG. 6G provides the cable cut-off wavelength for such optical fibres, expressed in nanometers, as a function of the above-expressed f function, when g=0.2326, on the x-axis.

Hence, as may be observed on FIGS. 6D and 6E, for a nominal MFD at 1310 nm between 9.0 and 9.2 µm, it is necessary to have $25.7 \times 10^{-3} \leq V_{01} - 0.2326 V_{02}$, in order to achieve macrobending losses at bending radii of 15 mm and 10 mm compliant with the requirements of the ITU-T G. 657.A2 Recommendation, which maximum accepted level is showed by the horizontal dashed line.

FIG. 7 illustrates an optical link 70 according to an embodiment of the present disclosure. Such an optical link comprises p spans of optical fibers, with p≥2, which are spliced together. FIG. 7 only shows optical fiber $70_1$ and optical fiber $70_p$, all the other potential optical fibers in the optical link being symbolized by dashed lines. At least one of the optical fibers in optical link 70 is such that it comprises the features of one embodiment described above. In other words, at least one of the optical fibers complies with the requirements of ITU-T G.657.A2 Recommendation, targets a Mode Field Diameter at 1310 nm greater than or equal to 9 microns and shows the specific design of the refractive index profile described above in relation to FIGS. 2 and 3, and notably, a trapezoid core, with a large but shallow trench. This optical fiber may be spliced in optical link 70 with a standard single-mode optical fiber compliant with the requirements of ITU-T.G. 652.D recommendation.

We now describe an exemplary method of manufacturing an optical fibre according to embodiments of the present disclosure. Such a manufacturing method comprises a first step of Chemical Vapour Deposition to form a core rod. During the Chemical Vapour Deposition doped or non-doped glass layers are deposited. The deposited glass layers form the core refractive index profile of the final optical. In a second step the core rod is provided with an external overcladding for increasing its diameter to form a preform. The overcladding may be derived from pre-formed silica tubes or by deposition of glass layers on the outer circumference of the core rod. Various techniques could be used for providing an overcladding by deposition of glass layers, such as Outside Vapour Deposition (OVD) or Advanced Plasma and Vapour Deposition (APVD). In a third step, the optical fibre is obtained by drawing the preform in a fibre drawing tower.

In order to fabricate the core-rod, a tube or substrate is generally mounted horizontally and held in a glass-making lathe. Thereafter, the tube or substrate is rotated and heated or energised locally for depositing components that determine the composition of the core-rod. Those of ordinary skill in the art will appreciate that the composition of the core-rod determines the optical characteristics of the fibre.

In this regard, both the centre part and the transition part of the core, the intermediate cladding and the trench are typically obtained using plasma chemical vapour deposition (PCVD) or furnace chemical vapour deposition (FCVD), which enable large quantities of fluorine and germanium to be incorporated into the silica and which enable a gradual change of their concentrations in the transition part of the core. The PCVD technique is for example described in patent document U.S. Pat. No. Re30,635 or U.S. Pat. No. 4,314,833.

Other techniques could also be used to form the core-rod, such as vapour axial deposition (VAD) or outside vapour deposition (OVD).

Optical fibres in accordance with the present invention are well suited for use in various optical communication systems. They are particularly suited for terrestrial transmission systems, as well as for fibre-to-the-home (FTTH) systems.

Moreover, they are typically compatible with conventional optical fibres, which make them appropriate for use in many optical communication systems. For example, the optical fibres according to embodiments of the invention are typically compatible with conventional optical fibres with respect to mode field diameter, thereby facilitating good fibre-to-fibre coupling.

In the specification and/or figure, typical embodiments of the invention have been disclosed. The present invention is not limited to such exemplary embodiments.

The invention claimed is:

1. A bending-loss insensitive single mode optical fibre having a Mode Field Diameter greater than or equal to 9.0 µm at a 1310 nm wavelength, said optical fibre having a core surrounded by a cladding, the core refractive index profile having a trapezoid-like shape, wherein a centre part of said core has a radius $r_0$ and a refractive index $n_0$ and a transition part of the trapezoid-like core refractive index profile ranges from radius $r_0$ to a radius $r_1 > r_0$ with a trapezoid ratio $r_0/r_1$ of said centre part of said core's radius $r_0$ to said transition part's radius $r_1$ between 0.1 and 0.6, wherein said cladding comprises at least one trench, which comprises a region of depressed refractive index, ranging from radius $r_2 \geq r_1$ to radius $r_3 > r_2$ and having a refractive index $n_t$, and an outer cladding ranging from radius $r_3$ to the end of a glass part of the single mode fibre and having a refractive index $n_4$, wherein the refractive-index difference of said trench with respect to said outer cladding $\Delta n_t = n_t - n_4$ is between $-2 \times 10^{-3}$ and $-0.9 \times 10^{-3}$, wherein said core has a surface integral $V_{01}$ of between $20 \times 10^{-3}$ µm and $24 \times 10^{-3}$ µm, the surface integral being defined according to the following equation: $V_{01} = \int_0^{r_1} \Delta n(r) \cdot dr$, where $\Delta n(r)$ is the refractive-index difference of said core with respect to said outer cladding as a function of the radius r, wherein said cladding has a surface integral Vo1 of between $-25\times10^{-3}$ µm and $-9\times10^{-3}$ µm, the surface integral being defined according to the following equation: $V_{02}=\int_{r_1}^{\infty}\Delta n(r)\cdot dr$, where $\Delta n(r)$ is the refractive-index difference of said cladding with respect to said outer cladding as a function of the radius r, and wherein said single mode optical fibre fulfils the following criterion:

$$25.7\times10^{-3}\le V_{01}-0.23261V_{02}\le 26.8\times10^{-3}.$$

2. The bending-loss insensitive single mode optical fibre of claim 1, wherein said trapezoid ratio $r_0/r_1$ of said centre part of said core's radius $r_0$ to said transition part's radius $r_1$ is between 0.2 and 0.5.

3. The bending-loss insensitive single mode optical fibre of claim 1, wherein said trapezoid ratio $r_0/r_1$ of said centre part of said core's radius $r_0$ to said transition part's radius $r_1$ is between 0.25 and 0.45.

4. The bending-loss insensitive single mode optical fibre of claim 1, wherein said cladding comprises an intermediate cladding ranging from radius $r_1$ to radius $r_2>r_1$ and having a refractive index $n_2$, and wherein said trench surrounds said intermediate cladding.

5. The bending-loss insensitive single mode optical fibre of claim 4, wherein said core surface integral $$V_{01}\approx\frac{\Delta n_0(r_1+r_0)+\Delta n_2(r_1-r_0)}{2},$$

where $\Delta n_0=n_0-n_4$ is the refractive-index difference of said centre part of said core with respect to said outer cladding and where $\Delta n_2=n_2-n_4$ is the refractive-index difference of said intermediate cladding with respect to said outer cladding, and wherein said cladding surface integral $V_{02}\approx(r_2-r_1)\times\Delta n_2+(r_3-r_2)\times\Delta n_t$.

6. The bending-loss insensitive single mode optical fibre of claim 5, wherein the refractive-index difference of said intermediate cladding with respect to said outer cladding $\Delta n_2=0$.

7. The bending-loss insensitive single mode optical fibre of claim 1, wherein $r_2=r_1$ and wherein said core surface integral $$V_{01}\approx\frac{\Delta n_0(r_1+r_0)+\Delta n_t(r_1-r_0)}{2},$$

where $\Delta n_0=n_0-n_4$ is the refractive-index difference of said centre part of said core with respect to said outer cladding, and wherein said cladding surface integral $V_{02}\approx(r_3-r_2)\times\Delta n_t$.

8. The bending-loss insensitive single mode optical fibre of claim 1, wherein the core outer radius $r_1$ is between 5.4 µm and 8.0 µm.

9. The bending-loss insensitive single mode optical fibre of claim 1, wherein the trench outer radius $r_3$ is between 16 µm and 22 µm.

10. The bending-loss insensitive single mode optical fibre of claim 1, wherein the refractive-index difference of said centre part of said core with respect to said outer cladding $\Delta n_0=n_0-n_4$ is between $5\times10^{-3}$ and $6\times10^{-3}$.

11. The bending-loss insensitive single mode optical fibre of claim 1, wherein said optical fibre has a maximum cable cut-off wavelength of 1240 nm.

12. The bending-loss insensitive single mode optical fibre of claim 1, wherein said optical fibre has a Mode Field Diameter at 1310 nm between 9.0 µm and 9.2 µm.

13. The bending-loss insensitive single mode optical fibre of claim 1, wherein said optical fibre complies with the requirements of the ITU-T G.657.A2 standard.

14. Optical fibre transmission system comprising at least one single mode fibre according to claim 1.

15. A bending-loss insensitive single mode optical fibre having a Mode Field Diameter greater than or equal to 9.0 µm at a 1310 nm wavelength, said optical fibre having a core surrounded by a cladding, the core refractive index profile having a trapezoid-like shape, wherein a centre part of said core has a radius $r_0$ and a refractive index $n_0$ and a transition part of the trapezoid-like core refractive index profile ranges from radius $r_0$ to a radius $r_1>r_0$ with a trapezoid ratio $r_0/r_1$ of said centre part of said core's radius $r_0$ to said transition part's radius $r_1$ between 0.1 and 0.6, and wherein the core outer radius $r_1$ is between 5.4 µm and 8.0 µm, wherein said cladding comprises at least one trench, which comprises a region of depressed refractive index, ranging from radius $r_2\ge r_1$ to radius $r_3>r_2$ and having a refractive index $n_t$, and an outer cladding ranging from radius $r_3$ to the end of a glass part of the single mode fibre and having a refractive index $n_4$, and wherein the trench outer radius $r_3$ is between 16 µm and 22 µm, wherein the refractive-index difference of said centre part of said core with respect to said outer cladding $\Delta n_0=n_0-n_4$ is between $5\times10^{-3}$ and $6\times10^{-3}$, wherein the refractive-index difference of said trench with respect to said outer cladding $\Delta n_t=n_t-n_4$ is between $-2\times10^{-3}$ and $-0.9\times10^{-3}$, wherein said core has a surface integral $V_{01}$ of between $20\times10^{-3}$ µm and $24\times10^{-3}$ µm, the surface integral being defined according to the following equation: $V_{01}=\int_0^{r_1}\Delta n(r)\cdot dr$, where $\Delta n(r)$ is the refractive-index difference of said core with respect to said outer cladding as a function of the radius r, wherein said cladding has a surface integral $V_{02}$ of between $-25\times10^{-3}$ µm and $-9\times10^{-3}$ µm, the surface integral being defined according to the following equation: $V_{02}=\int_{r_1}^{\infty}\Delta n(r)\cdot dr$, where $\Delta n(r)$ is the refractive-index difference of said cladding with respect to said outer cladding as a function of the radius r, and wherein said single mode optical fibre fulfils the following criterion:

$$25.7\times10^{-3}\le V_{01}-0.23261V_{02}\le 26.8\times10^{-3}.$$

16. The bending-loss insensitive single mode optical fibre of claim 15, wherein said cladding comprises an intermediate cladding ranging from radius $r_1$ to radius $r_2>r_1$ and having a refractive index $n_2$, and wherein said trench surrounds said intermediate cladding.

17. The bending-loss insensitive single mode optical fibre of claim 16, wherein said core surface integral $$V_{01}\approx\frac{\Delta n_0(r_1+r_0)+\Delta n_2(r_1-r_0)}{2},$$

where $\Delta n_0=n_0-n_4$ is the refractive-index difference of said centre part of said core with respect to said outer cladding and where $\Delta n_2=n_2-n_4$ is the refractive-index difference of said intermediate cladding with respect to said outer cladding, and wherein said cladding surface integral $V_{02}\approx(r_2-r_1)\times\Delta n_2+(r_3-r_2)\times\Delta n_t$.

18. The bending-loss insensitive single mode optical fibre of claim 15, wherein $r_2=r_1$ and wherein said core surface integral $$V_{01} \approx \frac{\Delta n_0(r_1 + r_0) + \Delta n_t(r_1 - r_0)}{2},$$

where $\Delta n_0 = n_0 - n_4$ is the refractive-index difference of said centre part of said core with respect to said outer cladding, and wherein said cladding surface integral $V_{02} \approx (r_3 - r_2) \times \Delta n_t$.

19. The bending-loss insensitive single mode optical fibre of claim 15, wherein said optical fibre complies with the requirements of the ITU-T G.657.A2 standard.

20. Optical fibre transmission system comprising at least one single mode fibre according to claim 15.

\* \* \* \* \*

UNITED STATES PATENT AND TRADEMARK OFFICE
CERTIFICATE OF CORRECTION

PATENT NO. : 10,962,708 B2
APPLICATION NO. : 16/954758
DATED : March 30, 2021
INVENTOR(S) : de Montmorillon et al.

Page 1 of 1

It is certified that error appears in the above-identified patent and that said Letters Patent is hereby corrected as shown below:

On the Title Page

<u>In the Abstract</u>
Delete Line 6 and insert: --prises a shallow trench with a refractive index difference $\Delta n_t$--

Delete Line 10 and insert: --surface integral $V_{01} = \int_0^{r_1} \Delta n(r). dr$ is between $20.10^{-3}$ μm and--

Delete Line 11 and insert: --$24.10^{-3}$ μm and the cladding surface integral $V_{02} = \int_{r_1}^{\infty} \Delta n(r). dr$ is--

In the Specification

Column 3, Table 1, delete 8th Attribute and insert: --Chromatic dispersion parameter 3-term Sellmeier fitting (1 260 nm to 1 460 nm)- --

Column 5, delete Line 3 and insert: --cutoff less than or equal to 1260 nm, and $0.25 \leq r_1/r_2 \leq 0.85$.--
Column 5, delete Line 56 and insert: --$25.7 \times 10^{-3} \leq V_{01} - 0.2326 V_{02} \leq 26.8 \times 10^{-3}$--
Column 6, delete Line 62 and insert: --present disclosure should fulfil the criterion: $25.7 \times 10^{-3} \leq$--
Column 7, delete Line 16 and insert: --$(r_3 - r_2) \times \Delta n_t$ --
Column 10, delete Line 39 and insert: --refractive-index difference $\Delta n_2$ with respect to the outer--

In the Claims

Claim 1, Column 23, delete Line 1 and insert: --wherein said cladding has a surface integral $V_{02}$ of--
Claim 1, Column 23, delete Line 11 and insert: --$25.7 \times 10^{-3} \leq V_{01} - 0.2326 V_{02} \leq 26.8 \times 10^{-3}$.--

Claim 15, Column 24, delete Line 37 and insert: --$V_{01} = \int_0^{r_1} \Delta n(r). dr$, where $\Delta n(r)$ is the refractive-index--
Claim 15, Column 24, delete Line 47 and insert: --$25.7 \times 10^{-3} \leq V_{01} - 0.2326 V_{02} \leq 26.8 \times 10^{-3}$.--

Signed and Sealed this
Thirteenth Day of July, 2021

Drew Hirshfeld
*Performing the Functions and Duties of the
Under Secretary of Commerce for Intellectual Property and
Director of the United States Patent and Trademark Office*